United States Patent
Zhou et al.

(10) Patent No.: US 10,264,606 B2
(45) Date of Patent: Apr. 16, 2019

(54) ACCESS POINT (AP) CONTROLLED UPLINK RTS/CTS CONFIGURATION AND DISABLEMENT

(71) Applicant: QUALCOMM Incorporated, San Diego, CA (US)

(72) Inventors: Yan Zhou, San Diego, CA (US); Gwendolyn Denise Barriac, Encinitas, CA (US); George Cherian, San Diego, CA (US); Simone Merlin, San Diego, CA (US); Alfred Asterjadhi, San Diego, CA (US); Qingjiang Tian, San Diego, CA (US); Gang Ding, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 15/244,713

(22) Filed: Aug. 23, 2016

(65) Prior Publication Data

US 2017/0064741 A1 Mar. 2, 2017

Related U.S. Application Data

(60) Provisional application No. 62/209,680, filed on Aug. 25, 2015, provisional application No. 62/291,430, filed on Feb. 4, 2016.

(51) Int. Cl.
*H04W 74/08* (2009.01)
*H04W 74/00* (2009.01)
*H04W 84/12* (2009.01)

(52) U.S. Cl.
CPC ..... *H04W 74/0816* (2013.01); *H04W 74/006* (2013.01); *H04W 84/12* (2013.01)

(58) Field of Classification Search
None
See application file for complete search history.

(56) References Cited

U.S. PATENT DOCUMENTS

| 2008/0144500 A1* | 6/2008 | Chen | H04L 43/16 370/235 |
| 2008/0144586 A1* | 6/2008 | Kneckt | H04W 74/002 370/337 |

(Continued)

OTHER PUBLICATIONS

Afaqui M.S., et al., "DSC Leveraging Uplink RTS/CTS Control; IEEE 80211-15/0882r1," Jul. 14, 2015 (Jul. 14, 2015), XP055316298, IEEE-SA mentor Retrieved from the Internet: URL:https://mentor.ieee.org/802.11/dcn/15/11-15-0882-01-00ax-dsc-leveraging-uplink-rts-cts-control.ppt [retrieved on Nov. 3, 2016]. (14 pages).

(Continued)

*Primary Examiner* — Saumit Shah
(74) *Attorney, Agent, or Firm* — Arent Fox, LLp and Qualcomm, Incorporated

(57) ABSTRACT

The present disclosure provides techniques for configuring the utilization of request-to-send/clear-to-send (RTS/CTS) protocol procedures based on varying conditions at the STA. For example, an AP may identify one or more conditions, when satisfied, may trigger the STA to either enable or disable uplink (UL) transmissions associated with a RTS/CTS protocol procedure. In some aspects, an AP may determine a transmit opportunity (TXOP) threshold for an STA and may determine whether to broadcast a message having the TXOP threshold to multiple STAs including the STA or unicast the message to the STA. An STA may receive a message from an AP having a TXOP threshold and may replace, based on an indication in the received message, a current TXOP threshold in the STA with the TXOP threshold in the received message. The STA may transmit an UL RTS frame in response to a determination that a planned TXOP duration satisfies the TXOP threshold.

25 Claims, 14 Drawing Sheets

(56) References Cited

U.S. PATENT DOCUMENTS

| | | |
|---|---|---|
| 2009/0086706 A1 | 4/2009 | Huang et al. |
| 2014/0160966 A1 | 6/2014 | Kang et al. |
| 2015/0063189 A1 | 3/2015 | Merlin et al. |
| 2015/0264710 A1* | 9/2015 | Kneckt ............. H04W 72/0446 370/336 |
| 2016/0073429 A1 | 3/2016 | Oteri et al. |
| 2016/0127947 A1* | 5/2016 | Bhanage ................... H04L 1/00 370/328 |
| 2017/0064740 A1 | 3/2017 | Zhou et al. |
| 2017/0195915 A1* | 7/2017 | Zhang ...................... H04B 7/26 |

OTHER PUBLICATIONS

International Search Report and Written Opinion—PCT/US2016/048490—ISA/EPO—dated Nov. 11, 2016. (13 pages).
International Search Report and Written Opinion—PCT/US2016/048498—ISA/EPO—dated Nov. 16, 2016. (13 pages).
Sigurd Schelstraete (QUANTENNA): "Uplink RTS/CTS Control; 11-15-0059-01-00ax-uplink-rts-cts-Control", IEEE Draft; 11-15-0059-01-00AX-Uplink-RTS-CTS-Control, IEEE-SA Mentor, Piscataway, NJ USA, vol. 802.11ax, No. 1, Jan. 12, 2015 (Jan. 12, 2015), pp. 1-9, XP068082573, [retrieved on Jan. 12, 2015].. (9 pages).

\* cited by examiner

ACCESS POINT (AP) CONTROLLED UPLINK RTS/CTS CONFIGURATION AND DISABLEMENT

CLAIM OF PRIORITY UNDER 35 U.S.C. § 120

The present application claims priority to Provisional Application No. 62/291,430 entitled "ACCESS POINT (AP) CONTROLLED UPLINK RTS/CTS CONFIGURATION AND DISABLEMENT," and filed Feb. 4, 2016, and further claims priority to Provisional Application No. 62/209,680 of same title, and filed Aug. 25, 2015. Both the Provisional Applications are assigned to the assignee hereof and hereby expressly incorporated by reference herein.

BACKGROUND

The present disclosure relates generally to communication systems, and more particularly, to techniques for access point (AP) controlled uplink request-to-send/clear-to-send (RTS/CTS) configuration and disablement in a wireless network.

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility, etc.) to another network, such as the Internet or the like. A set of STAs can communicate with each other through a common AP in what is referred to as a basic service set (BSS). However, some WLAN network deployments may be dense (e.g., have a large number of STAs deployed within the coverage area of multiple APs), which may result in issues related to channel or medium usage. In other examples, the wireless network may be configured as an "ad-hoc" communication system in which terminals asynchronously communication directly with each other without use of any specific AP.

Thus, with multiple STAs and APs operating in a limited area, traffic collisions and interferences may occur among STAs and/or APs attempting to access the wireless medium. In some aspects, various techniques and systems have been developed to avoid or minimize traffic collisions (e.g., where multiple STAs attempt to access the wireless medium simultaneously) by coordinating access to the wireless medium. One example of collision avoidance (CA) system may be a utilization of RTS/CTS protocol procedure. RTS/CTS protocol procedure are an optional mechanism used by the Institute of Electrical and Electronics Engineers (IEEE) 802.11 wireless networking protocol to reduce, for example, frame collisions introduced by the hidden node problem (e.g., when a node is visible from an AP, but not from other nodes communicating with the AP).

However, conventional system's reliance on a rigid RTS/CTS protocol procedure regardless of varying conditions in the wireless network may raise other issues that adversely affect overall network performance. In one example, utilization of conventional RTS/CTS protocol may result in the exposed terminal problem where a wireless node (e.g., overlapping basic service set (OBSS) node) that is nearby, but associated with another AP may overhear the exchange, and thus be forced to backoff and cease transmitting for the specified period in the RTS. In other example, transmitting RTS/CTS frame or packets prior to accessing the wireless medium may be counter intuitive where the uplink frame scheduled for transmission has a shorter duration than the RTS/CTS protocol procedure itself.

SUMMARY

The present disclosure provides various aspects related to techniques for configuring the utilization of RTS/CTS protocol procedures based on varying conditions at the STA. For example, in some aspects, an AP may identify one or more conditions, when satisfied, may trigger the STA to either enable or disable uplink (UL) transmissions associated with a RTS/CTS protocol procedure. Additionally or alternatively, in some aspects, an AP may determine a transmit opportunity (TXOP) threshold for an STA and may determine whether to broadcast a message having the TXOP threshold to multiple STAs including the STA or unicast the message to the STA. The AP may then broadcast or unicast the message in accordance to the determination. Additionally or alternatively, in some aspects, an STA may receive a message from an AP having a TXOP threshold and may replace, based on an indication in the received message, a current TXOP threshold in the STA with the TXOP threshold in the received message. The STA may transmit an UL RTS frame in response to a determination that a planned TXOP duration satisfies the TXOP threshold.

In one example, a method for wireless communication is disclosed. The method may include identifying, at an AP, one or more conditions for one or more of disabling or enabling UL transmissions of a RTS/CTS protocol at a STA associated with the AP. The method may further include transmitting a configuration message to the STA. The configuration message may include configuration information indicating the one or more conditions.

In another example, an apparatus for wireless communication is disclosed. The apparatus may include a processor and a memory coupled to the processor. The memory may include instructions executable by the processor to identify, at an AP, one or more conditions for disabling or enabling UL transmissions of a RTS/CTS protocol at a STA associated with the AP. The instructions may further include transmitting a configuration message to the STA. In some examples, the configuration message may include configuration information indicating the one or more conditions.

In further example, another method for wireless communication is disclosed. The method may include receiving, at a STA, a configuration message from an AP. The configuration message may include configuration information indicating one or more conditions for one or more of disabling or enabling UL transmissions of RTS/CTS protocol at the STA associated with the AP. The method may further include configuring the STA based on the configuration information provided in the configuration message.

In some examples, another apparatus for wireless communications is disclosed. The apparatus may include a processor and a memory coupled to the processor. The memory may include instructions executable by the processor to receive, at a STA, a configuration message from an AP. The configuration message may include configuration information indicating the one or more conditions for disabling or enabling UL transmissions of a RTS/CTS protocol at the STA associated with the AP. The apparatus may further include configuring the STA based on the configuration information provided in the configuration message.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive

DETAILED DESCRIPTION

Figure 1A:
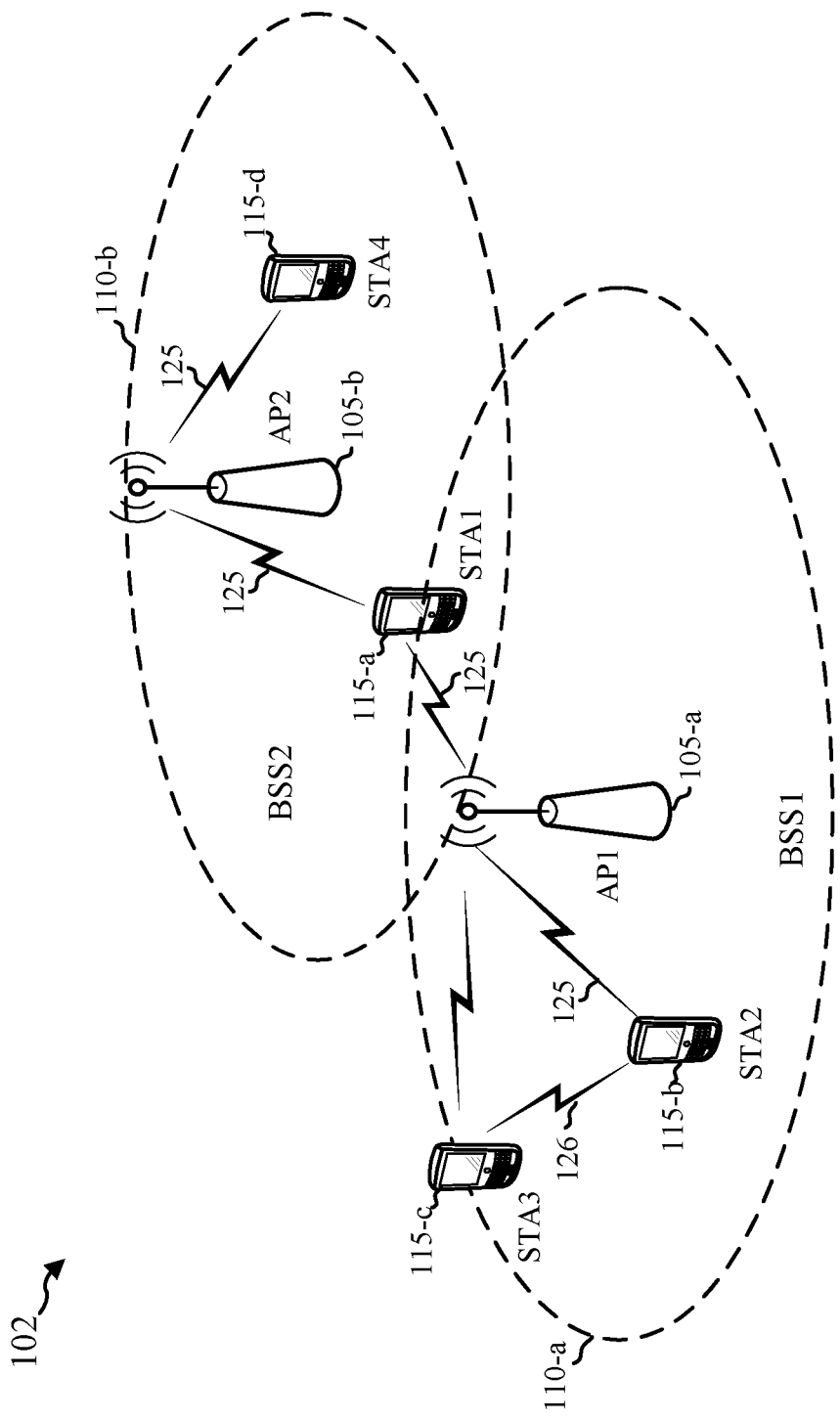
FIGS. 1A and 1B shows an example wireless communication system in which aspects of the present disclosure may be employed.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details. However, it will be apparent to those skilled in the art that these concepts may be practiced without these specific details.

As discussed above, wireless network technologies may include various types of WLANs. A WLAN may be used to interconnect nearby devices together, employing widely used networking protocols. Some WLAN network deployments may be dense (e.g., have a large number of STAs deployed within the coverage area of multiple APs), which may result in issues related to channel or medium usage. The various aspects described herein may apply to any communication standard, such as WiFi or, more generally, any member of the IEEE 802.11 family of wireless protocols.

In some aspects, wireless nodes or devices, such as stations and APs, may interact in a Carrier Sense Multiple Access (CSMA) type network, such as a network that conforms to the 802.11ah standard. CSMA is a probabilistic Media Access Control (MAC) protocol. "Carrier Sense" describes the fact that a wireless device attempting to transmit on a channel may use feedback from its receiver to detect a carrier wave before trying to send its own transmission. "Multiple Access" describes the fact that multiple wireless devices may send and receive on a shared channel. Accordingly, in a CSMA type network, a transmitting wireless device senses the channel and if the channel is busy (i.e. another wireless device is transmitting on the channel), the transmitting wireless device will defer its transmission to a later time. If, however, the channel is sensed as free, then the transmitting wireless device may transmit its data on the channel.

Clear Channel Assessment (CCA) is used to determine the state of the channel before a wireless device attempts to transmit thereon. The CCA procedure is executed while a wireless device's receiver is turned on and the wireless device is not currently transmitting a data unit such as a packet. A wireless device may sense whether the channel is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively more difficult than detecting the start of a packet and may only detect relatively stronger signals. As such, there is higher detection threshold with this method. In general, detection of another transmission on the channel is a function of the received power of the transmission, where the received power is the transmitted power minus the path loss.

Other CSMA transmission architectures may be employed as disclosed herein. RTS/CTS is one such protocol discussed below that relies on conditions established by the station (STA). RTS/CTS is an optional mechanism or protocol used in a CSMA environment, such as 802.11 ah, to reduce data collisions. Often data collisions are the result of a "hidden" wireless device, referred to as a "hidden node." A hidden node or wireless device in this context refers to a wireless device that is out of range of the transmitting wireless device, but in range of the receiver. The "request" and "clear" messages alleviate much of the hidden node problem.

In particular, in a CSMA environment, RTS/CTS functions as a method for virtual carrier sensing as is implemented in CSMA/CA (Carrier Sense Multiple Access with Collision Avoidance). A wireless device that intends to send data (transmitter device) initiates an RTS frame to one (unicast) or more (multicast, broadcast) wireless devices indicating the intent to transmit data. The receiving or receiver device (or devices) replies with a CTS frame, indicating that it is ready to receive the transmission. In some instances, the RTS frame is sent as part of an uplink (UL) transmission with a respective CTS frame response provided in a downlink (DL) transmission. In other instances, the CTS frame is sent as part of an UL transmission in response to a respective RTS frame provided in a DL transmission. The RTS/CTS frames also include information regarding a time period in which any other wireless devices receiving the frames should not attempt to access the medium.

In some aspects of the present disclosure, RTS/CTS may be implemented under circumstances dictated by a predetermined threshold. An exemplary predetermined threshold may indicate a minimum packet size before the RTS/CTS protocol is implemented. In certain circumstances, the STA may implement the RTS/CTS protocol when packets exceed such a threshold, and disable the RTS/CTS protocol when the packet size is less than the threshold. In accordance with aspects of the present disclosure, greater efficiencies may be realized and data collisions reduced in an architecture allowing a more flexible implementation of RTS/CTS. For instance, thresholds or rules for RTS/CTS implementation that are adaptive or set based on one or more conditions (e.g., wireless link conditions or conditions realized by the STA or the AP) may provide greater transmission efficiency and reduce data collisions.

Accordingly, in some aspects of the present disclosure, an AP may configure one or more STAs by identifying one or more frame types of UL transmissions associated with a RTS/CTS protocol and the one or more conditions for the STA to use the one or more frame types. The one or more frame types may include, but are not limited to, legacy RTS/CTS (e.g., frame type as control and subtype as RTS/CTS), legacy RTS/CTS in control wrapper frame type where the control wrapper contains contents of legacy RTS/CTS in addition to a high-throughput (HT) control field as described in current standard or any future modifications to the current standard, modified legacy RTS/CTS where contents of legacy RTS/CTS are redefined to carry new information (e.g., one or more bits in a MAC address field of a legacy CTS may be redefined to carry a BSS identifier to help nodes drop OBSS frames for better medium reuse, etc.), directional multi-gigabit (DMG) CTS, DMG CTS in control wrapper frame type, modified DMG CTS, RTS/CTS with new control frame subtype, and RTS/CTS for multi-user operations. Additionally or alternatively, each RTS/CTS frame type may offer a different deferral rule. For example, legacy RTS/CTS may be deferred at any time, while RTS/CTS in new control frame subtype with BSS identifier may be dropped by an OBSS node. As a result, in accordance with aspects of the present disclosure, an AP may configure one or more STAs in the wireless network to utilize different UL RTS/CTS frame types based on one or more conditions observed at the STA and/or the AP (e.g., if the STA is at the cell edge, the AP may configure the STA to utilize legacy RTS/CTS). In some aspects, AP may configure the STAs to include additional information in the UL RTS/CTS messages in order to achieve improved performance (e.g., medium reuse, link adaptation, scheduling, etc.).

FIG. 1A is a conceptual diagram 102 illustrating an example of a wireless local area network (WLAN) deployment in connection with various techniques described herein. The WLAN may include one or more access points (APs) and one or more mobile stations (STAs) associated with a respective AP. In this example, there are two APs deployed: AP1 105-*a* in basic service set 1 (BSS1) and AP2 105-*b* in BSS2, which may be referred to as an OBSS. AP1 105-*a* is shown as having at least three associated STAs (STA1 115-*a*, STA2 115-*b*, and STA3 115-*c*) and coverage area 110-*a*, while AP2 105-*b* is shown having one associated STA4 115-*d*) and coverage area 110-*b*. The STAs 115 and AP 105 associated with a particular BSS may be referred to as members of that BSS. In the example of FIG. 1, the coverage area of AP1 105-*a* may overlap part of the coverage area of AP2 105-*b* such that STA1 115-*a* may be within the overlapping portion of the coverage areas. The number of BSSs, APs, and STAs, and the coverage areas of the APs described in connection with the WLAN deployment of FIG. 1 are provided by way of illustration and not of limitation.

In some examples, the APs (e.g., AP1 105-*a* and AP2 105-*b*) shown in FIG. 1 are generally fixed terminals that provide backhaul services to STAs 115 within its coverage area or region. In some applications, however, the AP may be a mobile or non-fixed terminal. The STAs (e.g., STA1 115-*a*, STA2 115-*b*, STA3 115-*c*, STA4 115-*d*) shown in FIG. 1, which may be fixed, non-fixed, or mobile terminals, utilize the backhaul services of their respective AP to connect to a network, such as the Internet. Examples of an STA include, but are not limited to: a cellular phone, a smart phone, a laptop computer, a desktop computer, a personal digital assistant (PDA), a personal communication system (PCS) device, a personal information manager (PIM), personal navigation device (PND), a global positioning system, a multimedia device, a video device, an audio device, a device for the Internet-of-Things (IoT), or any other suitable wireless apparatus requiring the backhaul services of an AP. An STA may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP may also be referred to as: a base station, a base transceiver station, a radio base station, a radio transceiver, a transceiver function, or any other suitable terminology. The various concepts described throughout this disclosure are intended to apply to all suitable wireless apparatus regardless of their specific nomenclature.

Each of STA1 115-*a*, STA2 115-*b*, STA3 115-*c*, and STA4 115-*d* may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-*a* and AP2 105-*b* can include software applications and/or circuitry to enable associated STAs to connect to a network via communications link 125. The APs can send frames or packets to their respective STAs and receive frames or packets from their respective STAs to communicate data and/or control information (e.g., signaling).

Each of AP1 105-*a* and AP2 105-*b* can establish a communications link 125 with an STA that is within the coverage area of the AP. Communications link 125 can comprise communications channels that can enable both uplink and downlink communications. When connecting to an AP, an STA can first authenticate itself with the AP and then associate itself with the AP. Once associated, a communications link 125 may be established between the AP 105 and the STA 115 such that the AP 105 and the associated STA 115 may exchange frames or messages through a direct communications link 125. It should be noted that the wireless communication system, in some examples, may not have a central AP (e.g., AP 105), but rather may function as a peer-to-peer network between the STAs (e.g., STA2 115-*b* and STA3 115-*c* over communication link 126). Accordingly, the functions of the AP 105 described herein may alternatively be performed by one or more of the STAs 115.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for performing operations based on modifications and enhancements to dynamic sensitivity control may be applicable to any suitable wireless network regardless of the coverage range and the wireless access protocols utilized.

In some aspects, one or more APs (105-*a* and 105-*b*) may transmit on one or more channels (e.g., multiple narrowband channels, each channel including a frequency bandwidth) a beacon signal (or simply a "beacon"), via a communications link 125 to STA(s) 115 of the wireless communication system, which may help the STA(s) 115 to synchronize their timing with the APs 105, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In an aspect, a device (e.g., APs 105 and/or STAs 115) may include one or more components for performing various functions described in the present disclosure. For example, the device (e.g., APs 105 and/or STAs 115) may include a communication management component 405 (not shown—see e.g., FIG. 4) to perform procedures related to configuring the STAs by identifying which of the one or more UL frame type associated with RTS/CTS protocol to use under which of one or more conditions. Moreover, the communication management component 405 may, for each one or more of frame types for UL transmissions associated with an RTS/CTS protocol, identify a different type of information to be included in the RTS/CTS messages. In some examples, the communication management component 405 may also identify one or more transmission parameter values for the STA to transmit each of the one or more frame types. Transmit parameter(s) may be transmission considerations applied by the STA in transmitting UL RTS/CTS protocol frames, including, but not limited to, a modulation and coding scheme (MCS) index value, a bandwidth, a number of spatial streams (NSS), a transmission power, enhanced distributed channel access (EDCA) parameters, and/or energy detection thresholds. In yet further examples, the AP 105 may also identify one or more conditions for disabling UL transmissions of RTS/CTS protocol at the STA 115. For example, if a transmission overhead parameter is less than a predetermined overhead threshold (i.e., overhead to transmit the UL packet is less than the overhead required to transmit the RTS/CTS protocol message), the AP 105 may configure the STA 115 to disable UL transmission of the RTS/CTS protocol. For example, if the RTS/CTS frame duration is greater than ten percent (10%) of the TXOP duration, aspects of the present disclosure may be configured to disable the UL transmissions of RTS/CTS protocol. In another example, if the RTS/CTS frame duration is greater than fifty percent (50%) of the TXOP duration, aspects of the present disclosure may be configured to disable the UL transmissions of RTS/CTS protocol.

By way of example, as noted above, RTS/CTS protocol messages may be used to reduce data collisions between multiple STAs 115 transmitting uplink messages in a dense network. Specifically, an STA 115 that intends to send data initiates a RTS frame to one (unicast) or more (multicast, broadcast) wireless devices (e.g., other STAs 115) indicating the intent to transmit data. The receiving STA 115 (or STAs) replies with a CTS frame, indicating that it is ready to receive the transmission. The RTS/CTS frames also include information regarding a time period in which any other wireless devices receiving the frames should not attempt to access the medium. However, in order to improve performance, aspects of the present disclosure allow the AP 105 to configure the one or more STAs to use different UL frame types based on varying conditions. For example, an AP1 105-*a* may configure STA1 115-*a* that is at the edge of the coverage area 110-*a* to use a legacy UL RTS/CTS frame type, while configuring STA2 115-*b* that is closer to the AP 105-*a* to utilize a modified legacy UL RTS/CTS frame type. In some instances, the RTS frame is sent as part of an uplink (UL) transmission with a respective CTS frame response provided in a downlink (DL) transmission. In other instances, the CTS frame is sent as part of an UL transmission in response to a respective RTS frame provided in a DL transmission.

In some aspects, configuring the one or more STAs 115 may include transmitting a configuration message from the AP 105 to the STA(s) 115. In one or more examples, the AP 105 may transmit different configurations to different STA(s) 115. The configuration message may include configuration information indicating the one or more frame types and one or more conditions for the STA to use the one or more frame types. In some examples, the one or more frame types in the configuration message may include an UL RTS frame type, an UL CTS frame type, or both. Additionally or alternatively, the one or more conditions in the configuration message may include at least a first condition for using the UL RTS frame type, at least a second condition for using the UL CTS frame type, or both.

The STA(s) 115, upon receiving the configuration message from the AP 105 that includes configuration information indicating the one or more frame types and one or more conditions for the STA to use the one or more frame types, may configure itself based on the configuration information provided in the configuration message. Specifically, in some aspects, the STA 115 may update RTS/CTS frame type and revise one or more RTS/CTS parameter values based on configuration information received from the AP 105. In some aspects, the AP1 105-*a*, for example, may configure each of the STAs 115 (e.g., STA1 115-*a*, STA2 115-*b*, and STA3 115-*c*) on a per-STA basis. Thus, the AP1 105-*a* may transmit a first configuration message that includes information associated with one or more first frame types to the first STA1 115-*a*, and transmit a second configuration message that includes information associated with one or more second frame types for a second STA2 115-*b* for UL transmission. In some examples, the one or more second frame types for second STA2 115-*b* may be the same or different RTS/CTS protocol than the RTS/CTS protocol associated with the UL transmission for the first STA1 115-*a*.

Figure 1B:
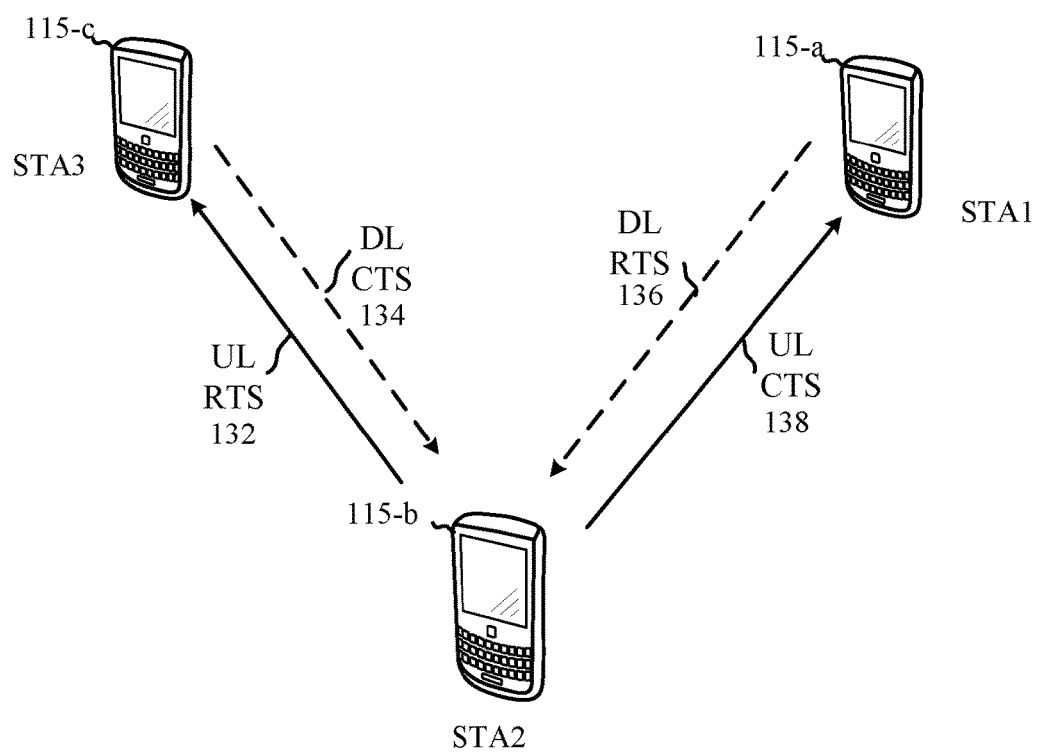

FIG. 1B is a conceptual diagram 104 illustrating an example of a wireless local area network (WLAN) deployment in connection with various techniques described herein. The diagram 104 may include one or more STAs 115 described with reference to FIG. 1A.

In one or more examples, the STA(s) 115 may receive a configuration message from an AP 105. The configuration message may include configuration information indicating the one or more frame types, one or more conditions for the STA to use the one or more frame types and one or more transmission parameter values for the STA to transmit with the one or more frame types. In some examples, the one or more frame types in the configuration message may include an UL RTS frame type, an UL CTS frame type, or both. In one or more examples, transmit parameter(s) may be transmission considerations applied by the STA in transmitting UL RTS/CTS protocol frames, including, but not limited to, a modulation and coding scheme (MCS) index value, a bandwidth, a number of spatial streams (NSS), a transmission power, enhanced distributed channel access (EDCA) parameters, a packet detection threshold and/or energy detection thresholds.

Thus, upon receiving the configuration information from an AP 105, one or more STAs 115 may modify the uplink transmissions associated with RTS/CTS protocol. For example, STA2 115-b, upon updating or modifying the parameter values associated with RTS/CTS protocol based on the configuration information received in a configuration message, may transmit an UL RTS frame 132 to STA3 115-c prior to initiating data transmission. The UL RTS frame 132 may be selected based on one or more frame types identified from a plurality of frame types by the AP. Additionally or alternatively, the UL RTS frame 132 may be transmitted utilizing the transmission parameter values identified in the configuration information by the AP 105. In response, the STA2 115-b may receive a DL CTS frame 134 indicating whether the STA3 115-c is available to receive the data transmission.

Additionally or alternatively, the STA2 115-b may also transmit UL CTS frame 138 in accordance with aspects of the present disclosure in response to receiving a DL RTS 136 message from STA1 115-a. The UL CTS frame 138 structure may be based on the one or more frame types identified from a plurality of frame types by the AP 105. In some aspects, the UL CTS frame 138 may further be transmitted utilizing the transmission parameter values (e.g., transmission power) identified by the AP 105.

Figure 2A:
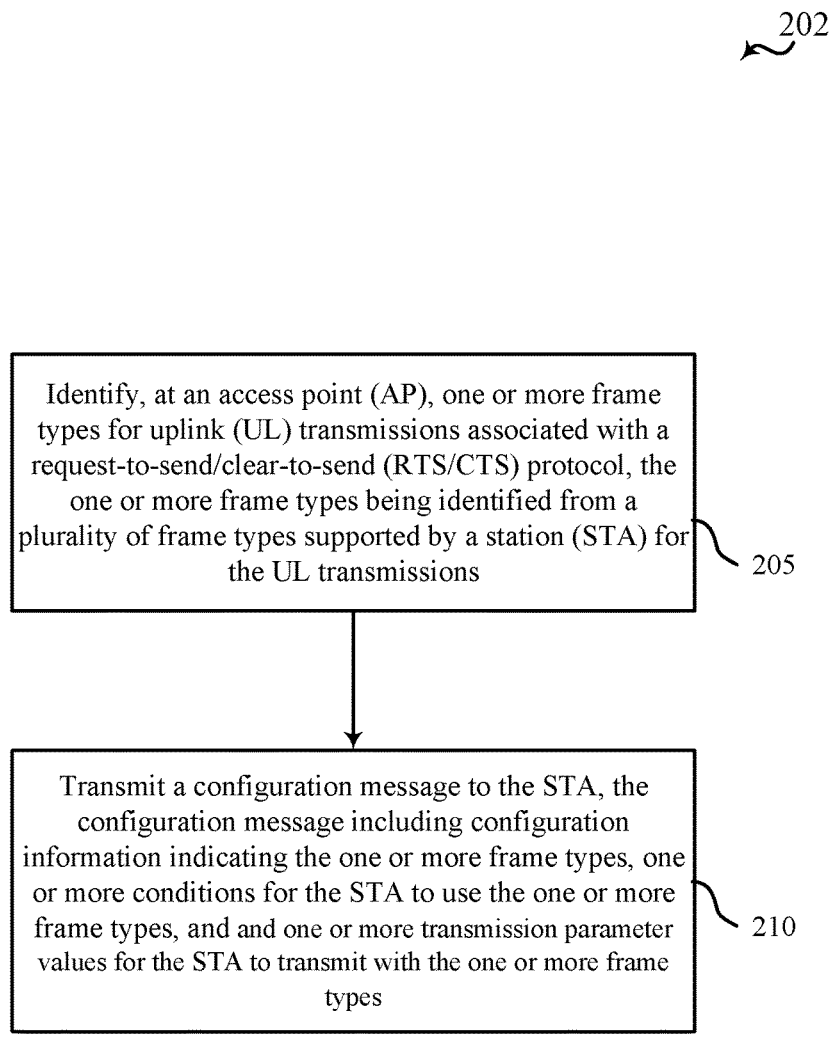
FIGS. 2A and 2B are flowcharts of example methods of wireless communication implemented on an AP in accordance with various aspects of the present disclosure.

FIG. 2A is a flowchart conceptually illustrating an example of a method 202 of wireless communication, in accordance with aspects of the present disclosure. For clarity, the method 202 is described below with reference to AP 105 described with reference to FIG. 1 and FIG. 4.

At 205, the method 202 may include identifying, at an AP, one or more frame types for UL transmissions associated with a RTS/CTS protocol, the one or more frame types being identified from a plurality of frame types supported by a STA for the UL transmissions. In some examples, the one or more frame types may include, but are not limited to, legacy RTS/CTS, legacy RTS/CTS wrapped in control wrapper frame where the control wrapper contains contents of legacy RTS/CTS, modified legacy RTS/CTS with one or more bits redefined to carry new information. The one or more frame types may further include directional multi-gigabit (DMG) CTS frame type, DMG CTS wrapped in control wrapper frame, a DMG CTS with one or more bits redefined to carry new information, RTS/CTS with advanced defined control frame subtype, or RTS/CTS for multi-user operation. Aspects of 205 may be performed by RTS/CTS protocol frame type identifier 410 described with reference to FIG. 4.

At 210, the method 202 may include transmitting a configuration message to the STA. The configuration message may include configuration information indicating the one or more frame types, one or more conditions for the STA to use the one or more frame types, one or more types of information for the STA to include in the one or more frame types, and one or more transmission parameter values for the STA to transmit with the one or more frame types. Transmit parameter(s) may be transmission considerations applied by the STA in transmitting UL RTS/CTS protocol frames, including, but not limited to, a MCS index value, a bandwidth, a NSS, a transmission power, EDCA parameters, and/or energy detection thresholds. In some examples, the one or more frame types in the configuration message include an UL RTS frame type, an UL CTS frame type, or both. Additionally or alternatively, the one or more conditions in the configuration message include at least a first condition for using the UL RTS frame type, at least a second condition for using the UL CTS frame type, or both. In some examples, the configuration message may be included in one or more information elements (IEs) of a frame (e.g., a management frame or beacon frame) transmitted from the AP 105. The AP 105 may broadcast, multicast, or unicast to the targeted device(s) (e.g., STAs 115) the frame having the one or more IEs. Aspects of 210 may be performed by STA configuration component 420 and transceiver 402 described with reference to FIG. 4. In some aspects, a type of information included in the one or more frame types contains at least one or more types of information for spatial reuse by the STA, information for buffer status, information for link adaptation, information for multi-user RTS/CTS operation, information for an operation mode, information for TXOP extension, or information for power saving.

In one or more examples, the one or more frame types in the configuration message may include a first frame type (selected from one of the plurality of frame types identified above and supported by the STA) for use as an UL CTS frame type to respond to a second frame type different from the first frame type. For example, the STA(s) may be configured such that a responding STA may respond with legacy CTS in response to receiving legacy RTS. Conversely, in other examples, the STA may transmit CTS with new control frame subtype in response to receiving RTS with new control frame subtype.

In yet further examples, the one or more frame types in the configuration message may include an UL RTS frame type configured to be deferred by OBSS nodes. Thus, in some aspects, an OBSS node (e.g., STA4 115-d in FIG. 1) that might hear an UL RTS frame transmitted by STA1 115-a (see FIG. 1), may defer or drop the RTS message without responding with a corresponding CTS message.

In some aspects, the STA configuration component 420 may identify the one or more conditions in the configuration message that includes at least one of the following conditions associated with using the UL RTS frame: (a) a received signal strength indication (RSSI) is less than a RSSI threshold, (b) a modulation and coding scheme (MCS) index value is less than a MCS threshold, (c) a PLCP protocol data unit (PPDU) duration is greater than a PPDU threshold, (d) a transmit opportunity (TXOP) is greater than a TXOP threshold, (e) a PLCP service data unit (PSDU) size is greater than a PSDU size threshold, (f) a retransmission number is greater than retry threshold, (g) a packet error rate (PER) is greater than PER threshold, (h) or an available bandwidth is greater than bandwidth threshold. Thus, in some examples, the AP may configure STA to use legacy RTS if any one or more of the above-identified conditions are met at the STA. With respect to the TXOP and the TXOP threshold, additional aspects are described below with respect to FIGS. 6-8B.

In yet further examples, the configuration information in the configuration message may further indicate a type of information included in each of the one or more frame types. For example, the type of information included in a first frame type of the one or more frame types contains at least one or more of: (a) information for spatial reuse by the STA, (b) information for buffer status, (c) information for link adaptation, (d) information for multi-user RTS/CTS protocols including the RTS/CTS protocol, (e) information for an operation mode, (f) information for TXOP extension, or (g) information for power saving.

In some aspects, the information for spatial reuse by the STA may include at last one of: (a) a transmit power of a frame sender, (b) a maximum allowed interference at the frame sender, (c) an indicator of allowing OBSS nodes for frame dropping, (d) a packet detection level range for OBSS nodes for frame dropping, or (e) an indicator for instructing the STA to drop OBSS frames. In some aspects, the AP 105 may also configure the STA 115 to utilize a specified value for parameters that may be configurable. For instance, the AP 105 may configure the STA to utilize maximum allowed interference value to −80 Decibel-milliwatts (dBm), so that OBSS nodes may drop the received RTS/CTS if estimated interference to the RTS/CTS sender is less than −80 dBm. In other examples, the AP 105 may set the packet detection level range such that OBSS nodes may drop the received RTS/CTS protocol message if the RSSI falls less than −70 dBm.

In some examples, the information for buffer status by the STA may include a buffer status (e.g., total size of the buffer or number of queued MPDUs) of a frame sender. In some aspects, the buffer status information may include information regarding the total or per queue. Thus, when the STA 115 transmits an RTS/CTS protocol message, the STA 115 may additionally include information regarding its buffer status for the receiving device.

Similarly, information for link adaptation the STA may include at least one of: (a) a channel quality indicator (CQI) at a frame sender, (b) a signal-to-interference-plus-noise (SINR) ratio at the frame sender, (c) an interference level at the frame sender, (d) a recommended MCS for response frame, or (e) a statistic on one or more of PER, delay, retry count, or busty interference occurrence.

In some aspects, the information for multi-user RTS/CTS protocols may include a common scrambling seed. Thus, the AP 105 may configure each of a plurality of STAs 115 in multi-user RTS/CTS protocol mode to utilize a common frame type format when simultaneously sending RTS/CTS protocol messages.

In yet further examples, the information for the operation mode for data transmissions may include at least one of: (a) a modulation and coding scheme (MCS) index value, (b) a bandwidth, (c) an NSS, (d) a transmission power, (e) an acknowledgment policy, (f) a rate control policy on bursty interference, or (g) an enhanced distributed channel access (EDCA) levels. In some aspects, the information for TXOP extension by the STA may include TXOP extension request/response information. Additionally or alternatively, the information for power saving by the STA may include sleep schedule request/response information in the RTS/CTS messages.

Figure 2B:
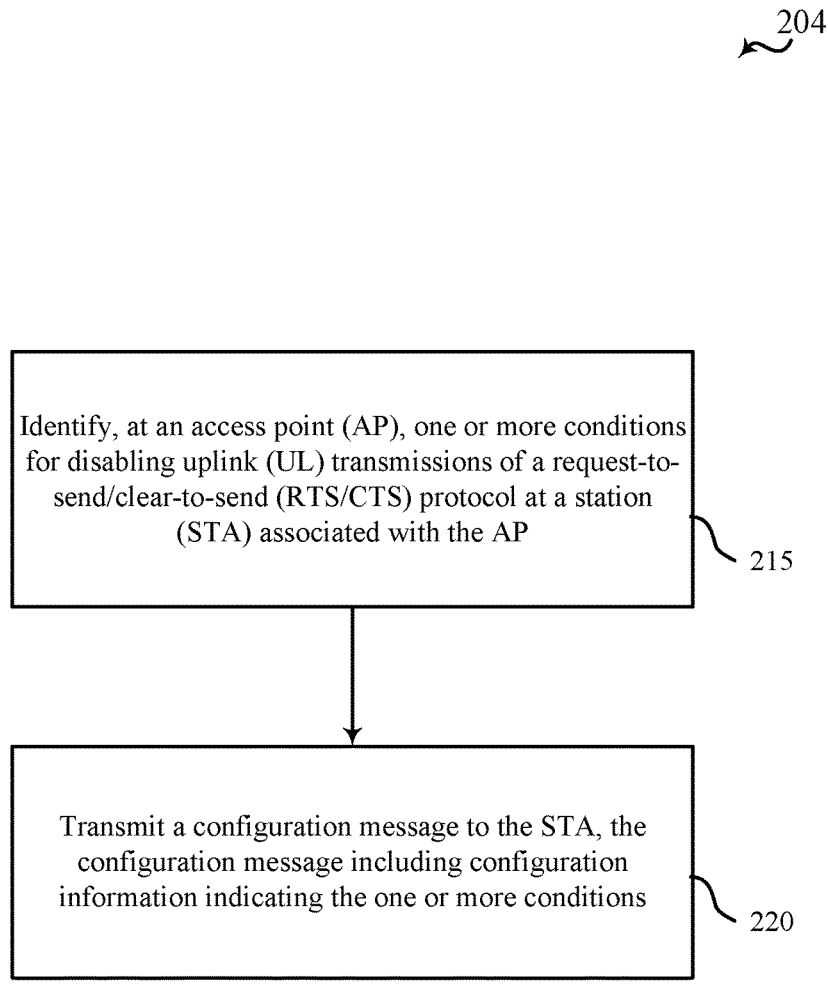

FIG. 2B is a flowchart conceptually illustrating an example of a method 204 of wireless communication, in accordance with another aspect of the present disclosure. For clarity, the method 204 is described below with reference to AP 105 described with reference to FIG. 1 and FIG. 4.

At 215, the method 204 may include identifying, at an AP, one or more conditions for disabling UL transmissions of a RTS/CTS protocol at a STA associated with the AP. The conditions for disabling UL transmissions may be different from the conditions described above with respect to FIG. 2A for the STA to use the one or more frame types. The one or more conditions may include a condition in which a transmission overhead parameter is less than a predetermined overhead threshold. In some aspects, the transmission overhead parameter may be a PLCP protocol data unit (PPDU) duration and the predetermined overhead threshold may be a PPDU threshold. Additionally or alternatively, the transmission overhead parameter may be a transmit opportunity (TXOP) parameter and the predetermined overhead threshold may be a TXOP threshold.

In other examples, the one or more conditions may include a condition in which a link quality parameter is greater than a predetermined link quality threshold. The link quality parameter may be a RSSI and the predetermined link quality threshold is a RSSI threshold. Additionally or alternatively, the link quality parameter may be a MCS index value and the predetermined link quality threshold is a RSSI threshold.

In some aspects, identifying the one or more conditions may comprise identifying a time window or channel in which to disable the UL transmissions of the RTS/CTS protocol at the STA. Thus, a configuration message (at 220) may include configuration information indicating the time window or channel in which to disable the UL transmissions of the RTS/CTS protocol.

In yet further examples, the one or more conditions may include a condition in which a collision parameter is less than a predetermined collision threshold. For example, the collision parameter may be a PER and the predetermined collision threshold may be a PER threshold. Additionally or alternatively, the collision parameter may be a number of retransmissions and the predetermined collision threshold may be a retry threshold.

In one or more examples, identifying the one or more conditions may comprise identifying a packet type or an access class for which to disable the UL transmissions of the RTS/CTS protocol at the STA. Thus, a configuration message may include a configuration information indicating the packet type or the access class of the STA. Aspects of 215 may be performed by condition identification component 415 described with reference to FIG. 4.

Figure 3A:
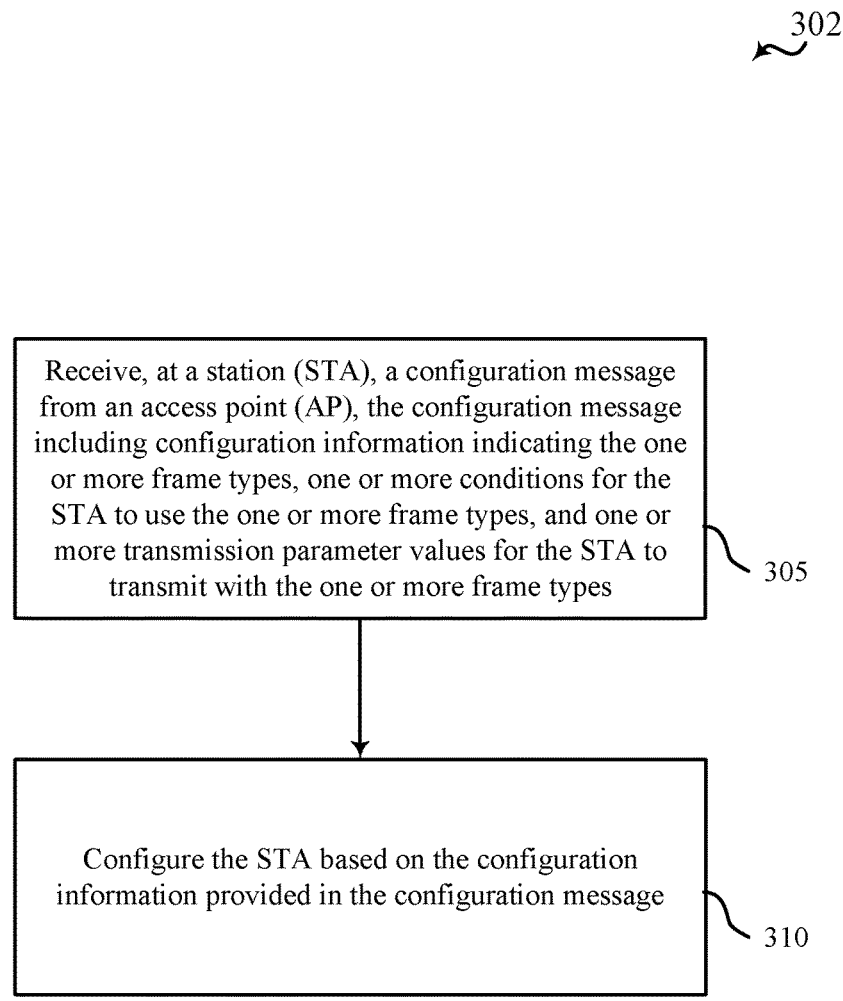
FIGS. 3A and 3B are flowcharts of example methods of wireless communication implemented on an STA in accordance with various aspects of the present disclosure.

FIG. 3A is a flowchart conceptually illustrating an example of a method 300 of wireless communication, in accordance with aspects of the present disclosure. For clarity, the method 302 is described below with reference to STA 115 described with reference to FIG. 1 and FIG. 5.

At 305, the method 300 may include receiving, at a STA, a configuration message from an AP, the configuration message including configuration information indicating the one or more frame types, one or more conditions for the STA to use the one or more frame type, and one or more transmission parameter values for the STA to transmit with the one or more frame types. Aspects of 305 may be performed by transceiver 502 described with reference to FIG. 5.

At 310, the method 304 may include configuring the STA based on the configuration information provided in the configuration message. Aspects of 305 may be performed by configuration component 505 described with reference to FIG. 5.

Figure 3B:
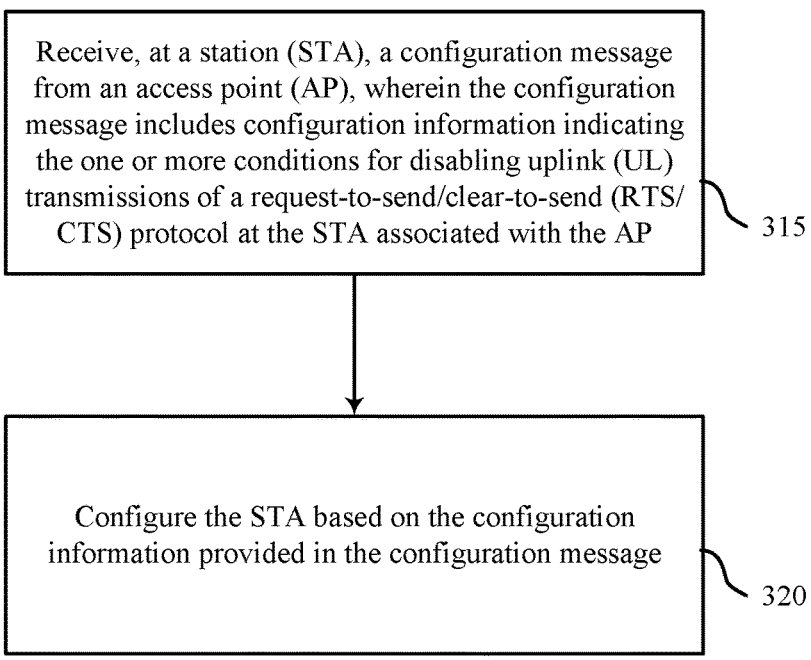

FIG. 3B is a flowchart conceptually illustrating an example of a method 304 of wireless communication, in accordance with aspects of the present disclosure. For clarity, the method 304 is described below with reference to STA 115 described with reference to FIG. 1 and FIG. 5.

At 315, the method 304 may include receiving, at a STA, a configuration message from an AP, the configuration message includes configuration information indicating the one or more conditions for disabling UL transmissions of a RTS/CTS protocol at the STA associated with the AP. Aspects of 305 may be performed by transceiver 502 described with reference to FIG. 5. Aspects of FIG. 3B may be performed by STA 115, memory 516 and/or processors 512, transceiver 502, configuration component 505, RTX/CTX protocol component 510, and/or TXOP threshold configuration component 425.

At 320, the method 304 may include configuring the STA based on the configuration information provided in the configuration message. Aspects of 320 may be performed by configuration component 505 described with reference to FIG. 5.

Figure 4:
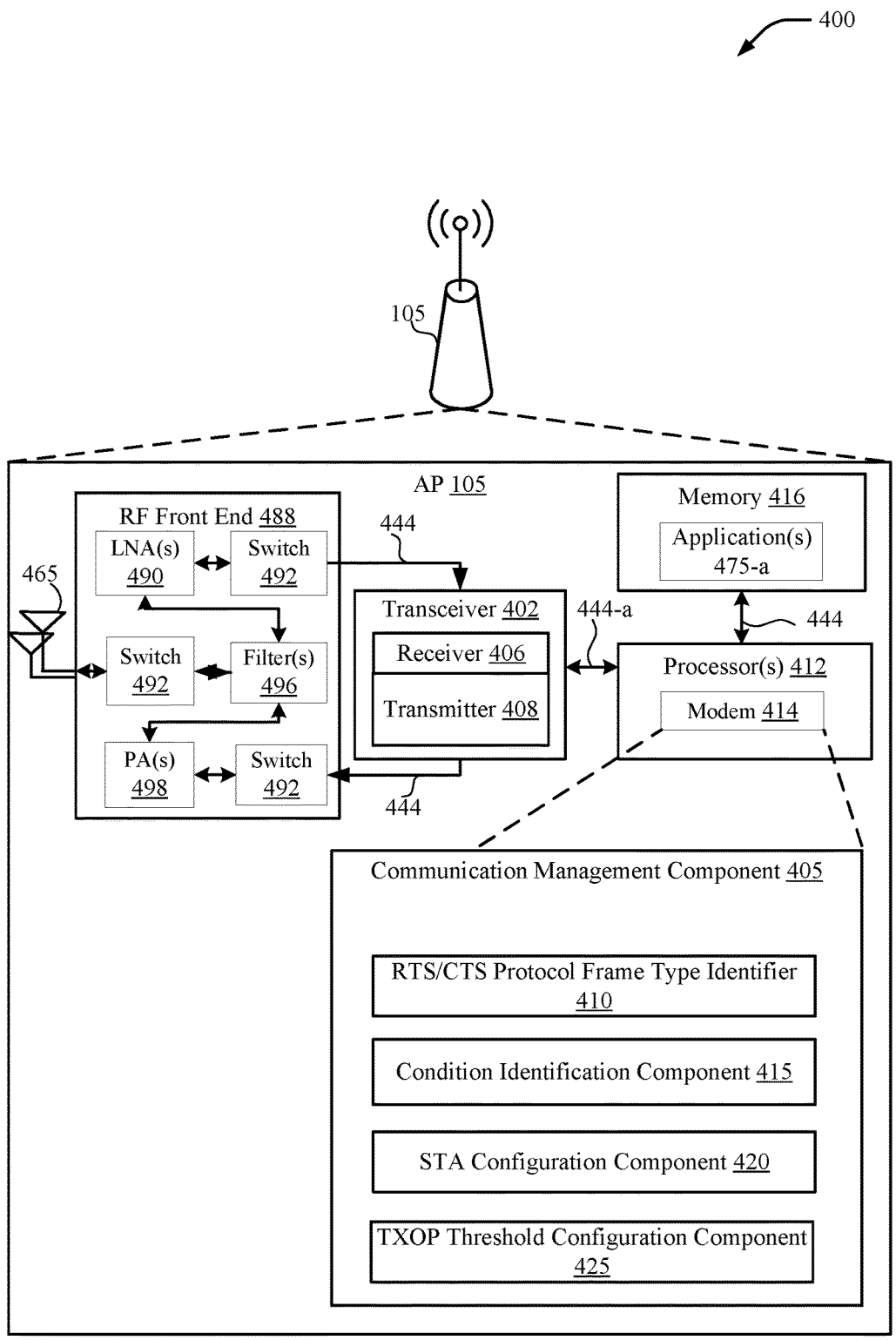
FIG. 4 shows hardware implementation of an AP that may be employed within a wireless communication system in accordance with various aspects of present disclosure.

FIG. 4 describes hardware components and subcomponents of the AP 105 for implementing one or more methods (e.g., methods 202, 204, and 800) described herein in accordance with various aspects of the present disclosure. For example, one example of an implementation of AP 105 may include a variety of components, some of which have already been described above, but including components such as one or more processors 412 and memory 416 and transceiver 402 in communication via one or more buses 444, which may operate in conjunction with communication management component 405 to enable one or more of the functions described herein related to including one or more methods of the present disclosure. Further, the one or more processors 412, modem 414, memory 416, transceiver 402, RF front end 488 and one or more antennas 465, may be configured to support voice and/or data calls (simultaneously or non-simultaneously) in one or more radio access technologies.

In an aspect, the one or more processors 412 can include a modem 414 that uses one or more modem processors. The various functions related to communication management component 405 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with communication management component 405 may be performed by transceiver 402.

Also, memory 416 may be configured to store data used herein and/or local versions of applications or communication management component 405 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining communication management component 405 and/or one or more of its subcomponents, and/or data associated therewith, when AP 105 is operating at least one processor 412 to execute communication management component 405 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by at least one STA 115. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transceiver 402 may including, but is not limited to, an RF transmitter.

Moreover, in an aspect, AP 105 may include RF front end 488, which may operate in communication with one or more antennas 465 and transceiver 402 for receiving and transmitting radio transmissions, for example, wireless communications transmitted by at least one STA 115 or wireless transmissions transmitted by AP 105. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488-a. In an aspect, transceiver may be tuned to operate at specified frequencies such that AP 105 can communicate with, for example, one or more STAs 115 or one or more cells associated with one or more APs 105. In an aspect, for example, modem 414 can configure transceiver 402 to operate at a specified frequency and power level based on the AP configuration of the AP 105 and the communication protocol used by modem 414.

In an aspect, modem 414 can be a multiband-multimode modem, which can process digital data and communicate with transceiver 402 such that the digital data is sent and received using transceiver 402. In an aspect, modem 414 can be multiband and be configured to support multiple frequency bands for a specific communications protocol. In an aspect, modem 414 can be multimode and be configured to support multiple operating networks and communications protocols. In an aspect, modem 414 can control one or more components of AP 105 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on AP configuration information associated with AP 105 as provided by the network during cell selection and/or cell reselection.

In some examples, the communication management component 405 may include a RTS/CTS protocol frame type identifier 410 for identifying, at an AP, one or more frame types for UL transmissions associated with RTS/CTS protocol, the one or more frame types being identified from a plurality of frame types supported by a STA for the UL transmissions as described with reference to FIG. 2. The RTS/CTS protocol frame type identifier 410 may comprise hardware, firmware, and/or software and may be configured to execute code or perform instructions stored in a memory (e.g., a computer-readable storage medium). The communication management component 405 may further include a condition identification component 415 for identifying a identifying, at an AP, one or more conditions for disabling UL transmissions of a RTS/CTS protocol at a STA associated with the AP. The communication management component 405 may comprise hardware, firmware, and/or software and may be configured to execute code or perform instructions stored in a memory (e.g., a computer-readable storage medium).

Additionally or alternatively, the communication management component 405 may include an STA configuration component 420 configured to generate configuration messages for transmission by the transceiver 402. The STA configuration component 420 may comprise hardware, firmware, and/or software and may be configured to execute code or perform instructions stored in a memory (e.g., a computer-readable storage medium). In some aspects, the configuration message may include configuration information indicating the one or more frame types, one or more conditions for the STA to use the one or more frame types, and one or more transmission parameter values for the STA to transmit with each of the one or more frame types.

Additionally or alternatively, the communication management component 405 may include a TXOP threshold configuration component 425 configured to perform the various functions described below with respect to TXOP threshold broadcasting/unicasting and TXOP threshold overwriting, as performed by an AP (see e.g., FIGS. 6, 7, and 8A). The TXOP threshold configuration component 425 may comprise hardware, firmware, and/or software and may be configured to execute code or perform instructions stored in a memory (e.g., a computer-readable storage medium).

Figure 5:
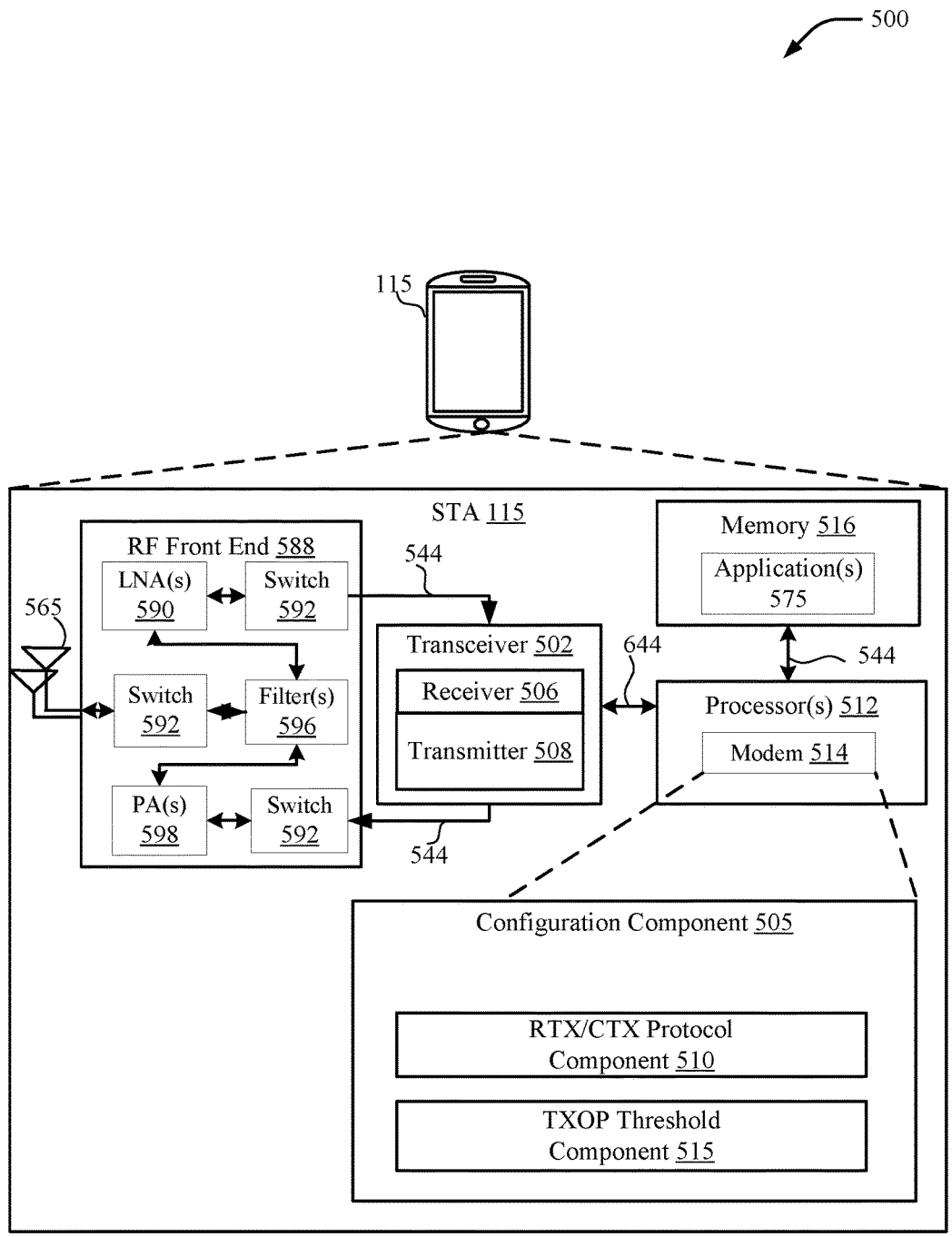
FIG. 5 shows hardware implementation of an STA that may be employed within a wireless communication system in accordance with various aspects of present disclosure.

FIG. 5 describes hardware components and subcomponents of the STA 115 for implementing one or more methods (e.g., methods 302, 304, and 820) described herein in accordance with various aspects of the present disclosure. For example, one example of an implementation of STA 115 may include a variety of components, some of which have already been described above, but including components such as one or more processors 512 and memory 516 and transceiver 502 in communication via one or more buses 544, which may operate in conjunction with configuration component 505 to enable one or more of the functions described herein related to including one or more methods of the present disclosure. Further, the one or more processors 512, modem 514, memory 516, transceiver 502, RF front end 588 and one or more antennas 565, may be configured to support voice and/or data calls (simultaneously or non-simultaneously) in one or more radio access technologies.

In an aspect, the one or more processors 512 can include a modem 514 that uses one or more modem processors. The various functions related to configuration component 505 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with configuration component 505 may be performed by transceiver 502.

Also, memory 516 may be configured to store data used herein and/or local versions of applications or configuration component 505 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining configuration component 505 and/or one or more of its subcomponents, and/or data associated therewith, when STA 115 is operating at least one processor 512 to execute configuration component 505 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one AP 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transceiver 502 may including, but is not limited to, an RF transmitter.

Moreover, in an aspect, STA 115 may include RF front end 588, which may operate in communication with one or more antennas 565 and transceiver 502 for receiving and transmitting radio transmissions, for example, wireless communications transmitted by at least one AP 105 or wireless transmissions transmitted by STA 115. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that STA 115 can communicate with, for example, one or more other STA 115 or one or more cells associated with one or more APs 105. In an aspect, for example, modem 514 can configure transceiver 502 to operate at a specified frequency and power level based on the STA configuration of the STA 115 and the communication protocol used by modem 514.

In an aspect, modem 514 can be a multiband-multimode modem, which can process digital data and communicate with transceiver 502 such that the digital data is sent and received using transceiver 502. In an aspect, modem 514 can be multiband and be configured to support multiple frequency bands for a specific communications protocol. In an aspect, modem 514 can be multimode and be configured to support multiple operating networks and communications protocols. In an aspect, modem 514 can control one or more components of STA 115 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on STA configuration information associated with STA 115 as provided by the network during cell selection and/or cell reselection.

In some aspects, the transceiver 502 may receive a configuration message from an AP. The transceiver 502 may aid in decoding the configuration message. In some aspects, the configuration message may indicate the one or more frame types and one or more conditions for the STA 115 to use the one or more frame types. Additionally or alternatively, the received configuration message may include configuration information indicating the one or more conditions for disabling UL transmissions of a RTS/CTS protocol at the STA associated with the AP. In one or more examples, the configuration component 505 may be configure the STA 115 based on the configuration information provided in the configuration message. For example, configuring the STA 115 may include revising or updating one or more RTS/CTS parameters at the RTX/CTX protocol component 510. In other words, configuration information may be stored in the RTX/CTX protocol component 510 and appropriate RTS/CTS parameters may be updated based on configuration information so that the correct frame types are used based on conditions observed at the STA 115.

Additionally or alternatively, the configuration component 505 may include a TXOP threshold component 515 configured to perform the various functions described below with respect to receiving TXOP threshold broadcasting/unicasting and TXOP threshold overwriting, as performed by an STA (see e.g., FIGS. 6, 7, and 8B). The TXOP threshold component 515 may comprise hardware, firmware, and/or software and may be configured to execute code or perform instructions stored in a memory (e.g., a computer-readable storage medium). Moreover, aspects of the TXOP threshold component 515 may operate in conjunction with aspects of RTX/CTX protocol component 510, and in some examples, TXOP threshold component 515 may be implemented at least partially in RTX/CTX protocol component 510.

As described above, an AP can be used to control UL RTS/CTS operations in an STA. That is, various aspects described above provide for mechanisms or techniques that allow an AP to configure the use of RTS/CTS initiated by a non-AP STA. As such, different criteria and signaling for RTS/CTS configuration are provided in this disclosure, with further aspects described below.

For example, aspects of this disclosure provide for TXOP-based UL RTS/CTS enablement. That is, an AP (e.g., AP 105) may signal, transmit, or otherwise indicate a 'TXOP duration' threshold, sometimes simply referred to as a TXOP threshold, to one or more STAs in the BSS of the AP. An STA (e.g., STA 115) that receives the indication of the TXOP threshold from the AP and that obtains a TXOP, may then start the TXOP by sending RTS (e.g., RTS frame) if the planned TXOP duration satisfies (e.g., exceeds) the TXOP threshold. This approach, however, need not prevent other implementations in which additional conditions are defined for having an STA transmit RTS/CTS. For example, an STA may determine or decide to send RTS when the planned TXOP duration does not satisfy the TXOP threshold (e.g., TXOP<TXOP threshold) when other considerations are taken into account.

In some aspects, TXOP may be a useful metric because it is a more general metric to quantify the overhead presented by RTS/CTS. For example, if overhead is small, RTS/CTS may be useful in improving protection from hidden nodes and CSMA collisions at negligible cost. In some instances, PSDU and TXTIME are considered as examples of metrics to quantify overhead. However, the size of PSDU need not reflect the actual transmission time (e.g., if rates are higher the time of PSDU transmission is shorter. Moreover, TXTIM is not clearly defined in case of multiple frame exchanges in TXOP protected by RTS/CTS. TXOP, as noted above, may be a better metric or parameter to quantify overhead because an STA may have UL data bursts or mixed UL and DL frames in TXOP (e.g., reverse direction grant (RDG) initiated by STA, power save poll (PS-poll) and DL data).

Figure 6:
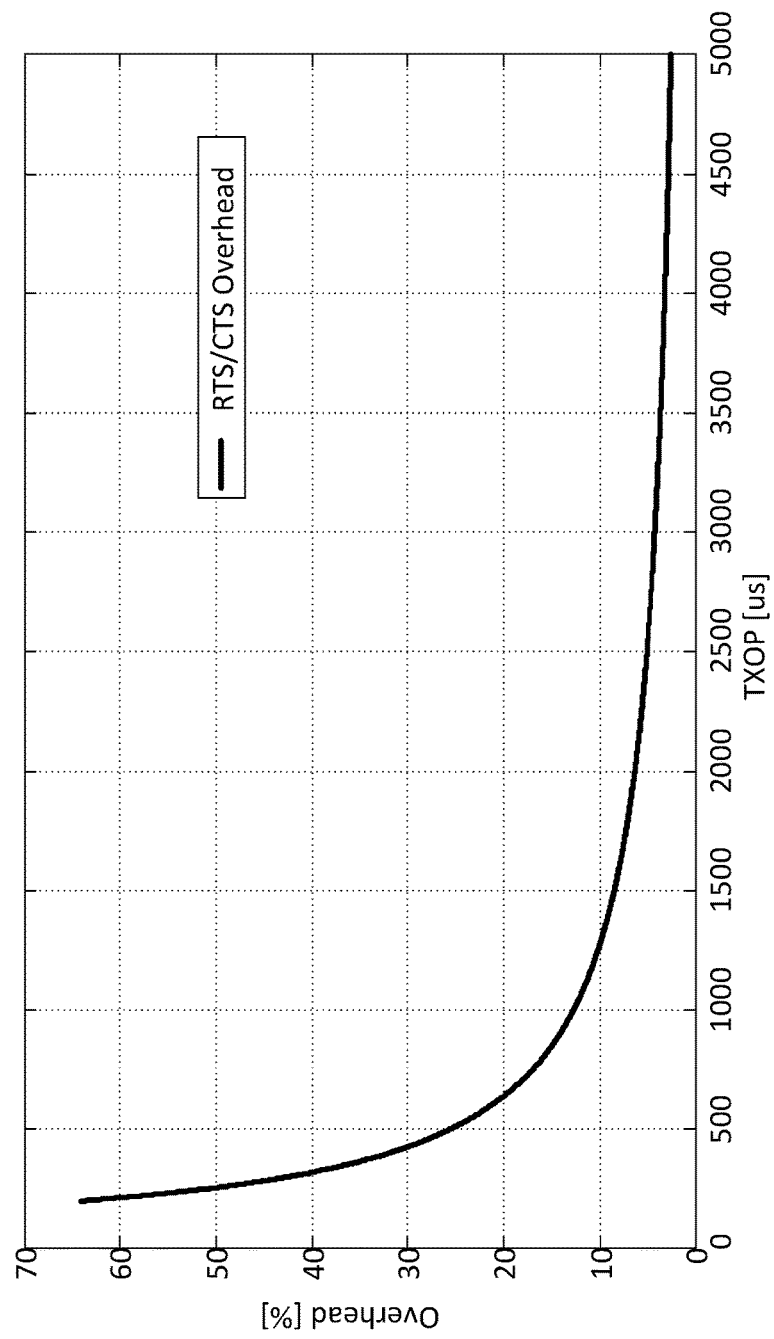
FIG. 6 shows a chart illustrating an example RTS/CTS overhead as a function of TXOP.

FIG. 6 shows a chart 600 illustrating an example RTS/CTS overhead as a function of TXOP. In chart 600, RTS/CTS overhead percentage (%) is shown as a function of TXOP, where overhead is defined as RTS/CTS durations in addition to 2×SIFS. For example, RTS duration may be 52 µs, while CTS duration may be 44 µs. The results shown in chart 600, which clearly illustrate the reduction of RTS/CTS overheard with increasing TXOP duration, are based on the following conditions: 6 Mbps, 20 µs preamble, 16 service bits, and 6 tail bits.

Figure 7:
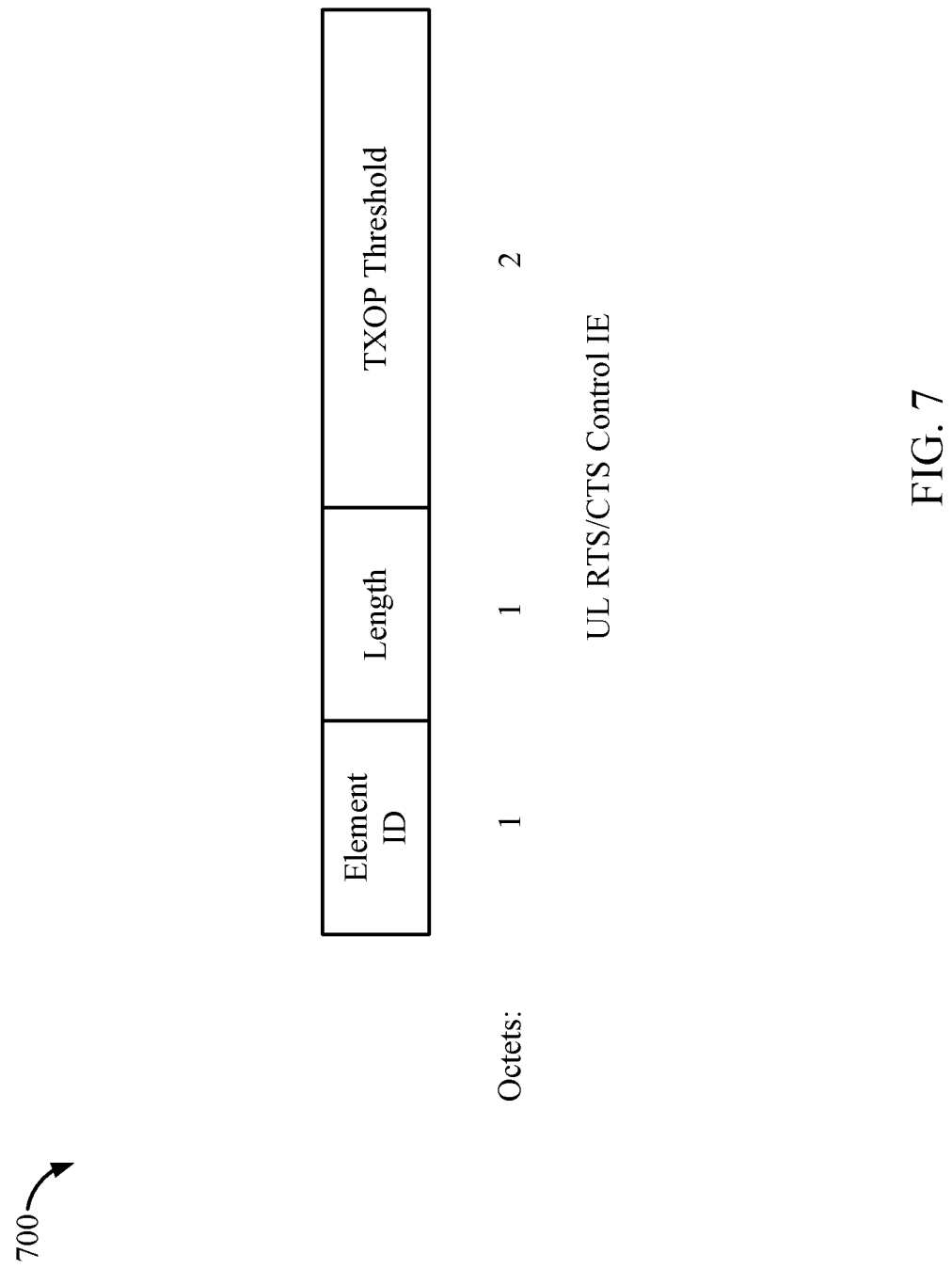
FIG. 7 shows a block diagram illustrating a control information element (IE) in accordance with various aspects of present disclosure.

FIG. 7 shows a block diagram 700 illustrating a control information element (IE) in accordance with various aspects of present disclosure. The control IE in diagram 700 may refer to an UL RTS/CTS control IE, which may be used by an AP to signal or convey TXOP thresholds. As shown, the control IE may include various portions or fields. A first portion or field may be the element identifier (ID), which may involve, for example, one octet. A second portion or field may be the length, which may involve, for example, one octet. A third portion or field may be the TXOP threshold, which may involve, for example, two octets. The control IE, its size, and the various portions, fields, or sections shown in FIG. 7 are provided by way of illustration and not of limitation. Also included in any one of the portions shown, or in a different portion, may be an indication of whether a STA receiving the control IE is to replace or overwrite its current TXOP threshold with the one in the control IE. As described in more detail below, such indication may be a single common bit that is set or a bit in a bitmap that is set.

In an aspect related to the control IE shown in FIG. 7, in one case, the AP can configure an STA to enable RTS in each instance by simply setting the TXOP threshold to zero ("0") such that a planned TXOP duration greater than zero will always trigger the sending of RTS.

In another aspect, an AP may broadcast a TXPO threshold to multiple STAs or may transmit TXOP thresholds on a per-STA basis (e.g., unicast transmissions). Accordingly, a mechanism or technique is needed to indicate if a broadcast TXOP threshold is to overwrite or replace a current or per-STA TXOP threshold, or if a per-STA TXOP threshold is to overwrite or replace a current broadcast TXOP threshold. When, for example, a control IE such as the one in FIG. 7 is broadcast by an AP, the control IE may include an "overwrite" bit that is added to indicate if an STA receiving the control IE is to overwrite or replace a current per-STA TXOP threshold (e.g., one previously provided as a per-STA TXOP threshold to that particular STA) with the TXOP threshold that is part of the broadcast control IE. For example, a single bit may be used for all STAs such that when such single bit is set, a common overwrite or replace indication is provided to all the STAs. In another example, a bit can be used on a per-STA basis by having the AP signal a bitmap with each bit in the bitmap corresponding to an STA's association ID (AID). In such an example, each bit that is set in the bitmap would indicate to its corresponding STA to overwrite or replace the STA's current TXOP threshold with the TXOP threshold in the control IE.

Figure 8A:
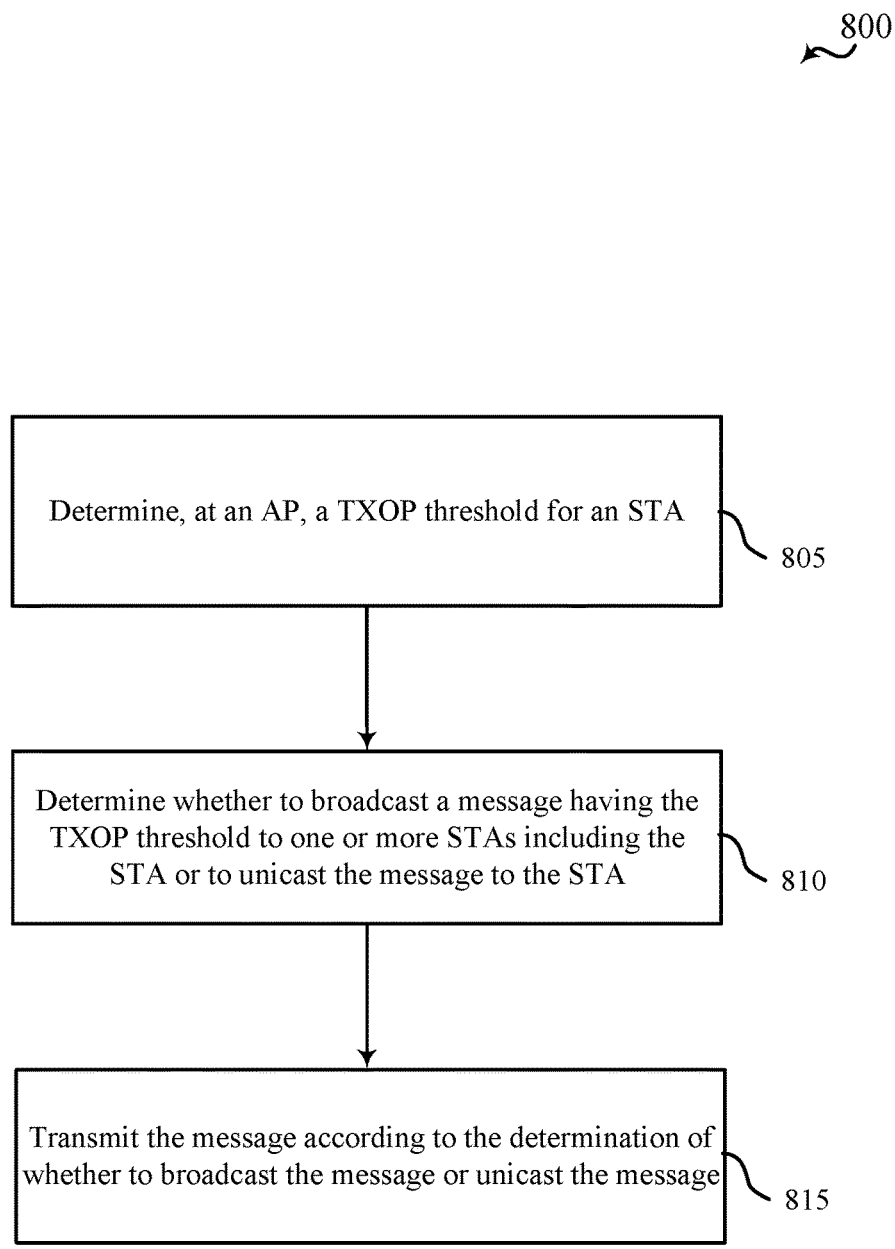
FIG. 8A is a flowchart of another example method of wireless communication implemented on an AP in accordance with various aspects of the present disclosure.

FIG. 8A is a flowchart of another example method of wireless communication implemented on an AP in accordance with various aspects of the present disclosure. Aspects of FIG. 8A may be performed by AP 105, memory 416 and/or processors 412, transceiver 402, communication management component 405, and/or TXOP threshold configuration component 425.

At block 805 of method 800, an AP (e.g., AP 105) may determine a TXOP threshold for an STA (e.g., STA 115). In some examples, aspects of block 805 may be performed by TXOP threshold configuration component 425 described with reference to FIG. 4.

At block 810 of method 800, the AP may determine whether to broadcast a message (e.g., a message including a control IE as shown in FIG. 7) having the TXOP threshold to one or more STAs including the STA, or to unicast the message having the TXOP threshold to the STA.

At block 815 of method 800, the AP may transmit (e.g., via transceiver 402) the message according to the determination of whether to broadcast the message or unicast the message.

In another aspect of method 800, the AP may transmit an indication to replace a current TXOP threshold with the TXOP threshold in the message. In one example, transmitting the message includes broadcasting the message and the indication is a single bit in the broadcast message that is a common indication for each of the one or more STAs to replace a current TXOP threshold with the TXOP threshold in the broadcast message. In another example, transmitting the message includes broadcasting the message and the indication is a bitmap in the broadcast message where each set bit in the bitmap identifies a respective one of the one or more STAs for which the current TXOP threshold is to be replaced with the TXOP threshold in the broadcast message.

In another aspect of method 800, transmitting the message includes unicasting the message to the STA and a current TXOP threshold in the STA is a previously broadcast TXOP threshold to be replaced with the TXOP threshold in the unicast message.

In another aspect of method 800, the message includes an UL RTS/CTS control IE having the TXOP threshold.

Figure 8B:
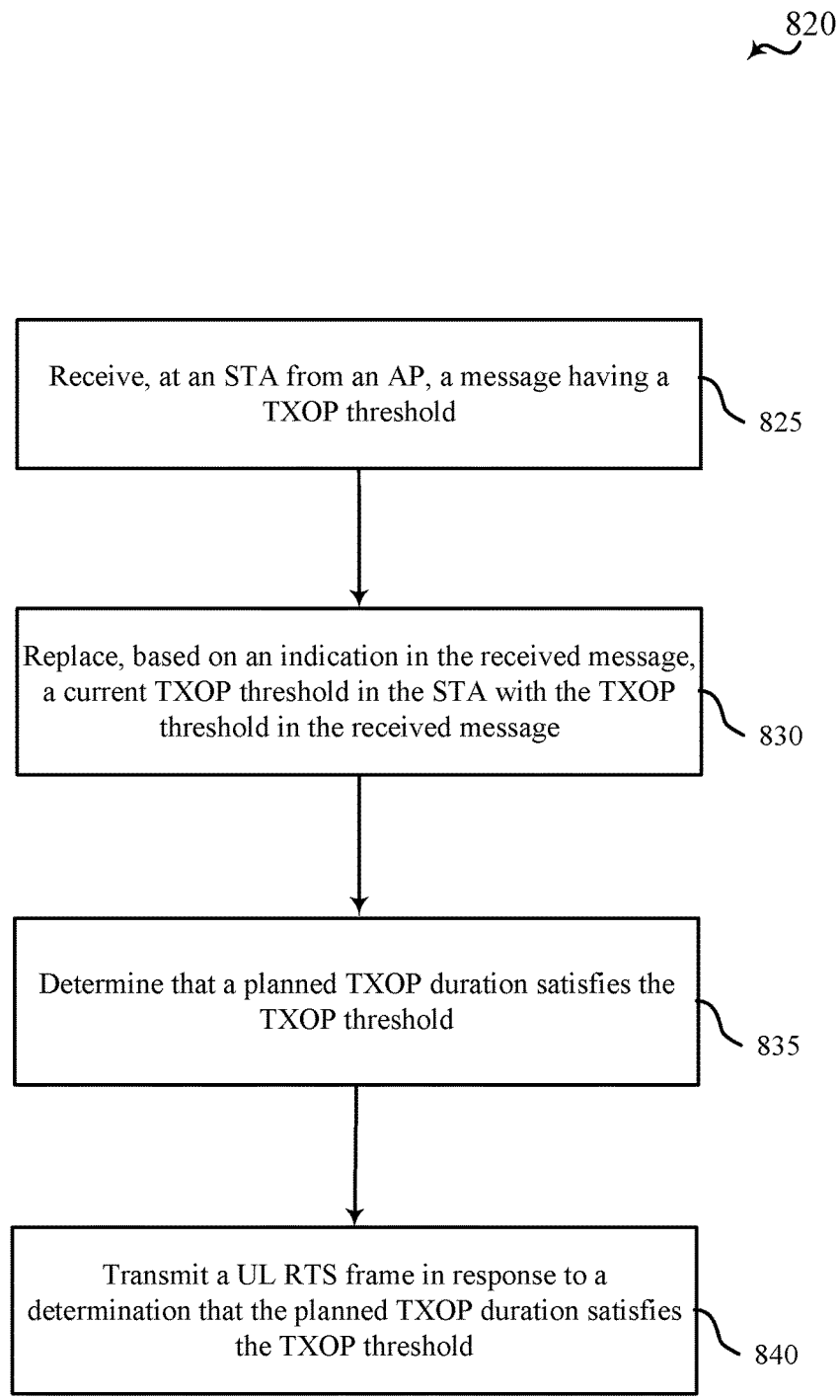
FIG. 8B is a flowchart of another example method of wireless communication implemented on an STA in accordance with various aspects of the present disclosure.

FIG. 8B is a flowchart of another example method of wireless communication implemented on an STA in accordance with various aspects of the present disclosure. Aspects of FIG. 8B may be performed by STA 115, memory 516 and/or processors 512, configuration component 505, and/or TXOP threshold component 515.

At block 825 of method 820, an STA (e.g., STA 115) may receive from an AP (e.g., AP 105) a message having a TXOP threshold.

At block 830 of method 820, the STA may replace or overwrite, based on an indication in the message received from the AP, a current TXOP threshold in the STA with the TXOP threshold in the received message.

At block 835 of method 820, the STA may determine that a planned TXOP duration satisfies (e.g., exceeds) the TXOP threshold.

At block 840 of method 820, the STA may transmit (e.g. via transceiver 502), a UL RTS frame in response to the determination that the planned TXOP duration satisfies the TXOP threshold.

In another aspect of method 820, the message is a broadcast message from the AP, and the indication is a single bit in the broadcast message that is a common indication to replace the current TXOP threshold with the TXOP threshold in the broadcast message.

In another aspect of method 820, the message is a broadcast message from the AP, and the indication is a bitmap in the broadcast message where one set bit in the bitmap identifies the STA as an STA for which the current TXOP threshold is to be replaced with the TXOP threshold in the broadcast message.

In another aspect of method 820, the message is a unicast message and the current TXOP threshold in the STA is a previously broadcast TXOP threshold to be replaced with the TXOP threshold in the unicast message. In another aspect of method 820, the message includes an UL RTS/CTS control IE having the TXOP threshold.

Figure 9A:
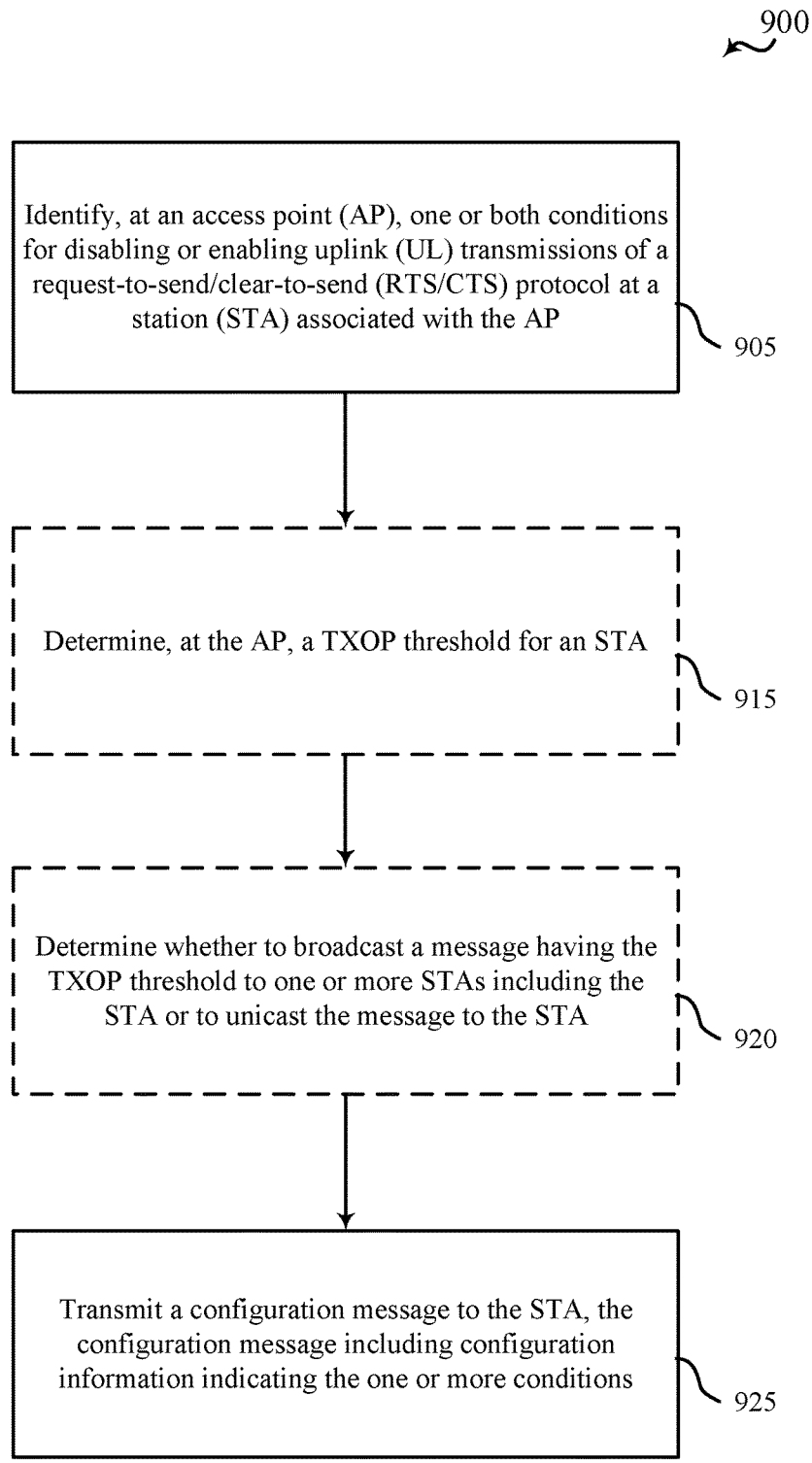
FIG. 9A is a flowchart of an example method of wireless communication implemented on an AP in accordance with various aspects of the present disclosure.

FIG. 9 is a flowchart conceptually illustrating an example of a method 900 of wireless communication, in accordance with another aspect of the present disclosure. For clarity, the method 900 is described below with reference to AP 105 described with reference to FIG. 1 and FIG. 4. In some examples, the method 900 may incorporate aspects of the methods described with reference to FIGS. 2B and 8A in whole or in part.

At 905, the method may include identifying, at an AP, one or more conditions for one or more of disabling or enabling UL transmissions of a RTS/CTS protocol at a STA associated with the AP. Aspects of 905 may be performed by condition identification component 415 described with reference to FIG. 4.

In some examples, the conditions for disabling UL transmissions of the RTS/CTS protocol may include a disabling condition in which a transmission overhead parameter is less than a predetermined overhead threshold. In some aspects, the transmission overhead parameter may be a PPDU duration and the predetermined overhead threshold may be a PPDU threshold. Additionally or alternatively, the transmission overhead parameter may be a TXOP parameter and the predetermined overhead threshold may be a TXOP threshold. In other examples, the one or more conditions may include a disabling condition in which a link quality parameter is greater than a predetermined link quality threshold. The link quality parameter may be a RSSI and the predetermined link quality threshold is a RSSI threshold. Additionally or alternatively, the link quality parameter may be a MCS index value and the predetermined link quality threshold is a RSSI threshold.

In some aspects, identifying the one or more conditions may comprise identifying a time window or channel in which to disable the UL transmissions of the RTS/CTS protocol at the STA. Thus, a configuration message (at 925) may include configuration information indicating the time window or channel in which to disable the UL transmissions of the RTS/CTS protocol. In yet further examples, the one or more conditions may include a disabling condition in which a collision parameter is less than a predetermined collision threshold. For example, the collision parameter may be a PER and the predetermined collision threshold may be a PER threshold. Additionally or alternatively, the collision parameter may be a number of retransmissions and the predetermined collision threshold may be a retry threshold. In one or more examples, identifying the one or more conditions may comprise identifying a packet type or an access class for which to disable the UL transmissions of the RTS/CTS protocol at the STA. Thus, a configuration message may include a configuration information indicating the packet type or the access class of the STA.

Additionally or alternatively, the conditions for enabling UL transmissions of the RTS/CTS protocol may include setting, at the AP, a TXOP threshold for the STA. In some examples, the STA determines a planned TXOP duration satisfies the TXOP threshold set by the AP in its consideration of whether to enable RTS/CTS protocol. In some aspects, the STA may start the TXOP by sending an RTS if the planned TXOP duration exceeds the TXOP threshold. Alternatively, the STA may cease to enable the RTS/CTS protocol when the planned TXOP duration is less than the TXOP threshold. Accordingly, in an some aspects, the method may optionally at 915 may include determining a TXOP threshold for the STA. In some examples, aspects of block 925 may be performed by TXOP threshold configuration component 425 described with reference to FIG. 4.

At 920, the method may optionally include determining whether to broadcast a message having the TXOP threshold to one or more STAs including the STA or to unicast the message to the STA. Aspects of block 920 may be performed by the transceiver 402 described with reference to FIG. 4.

At 925, the method may include transmitting a configuration message to the STA. The configuration message may include configuration information indicating the one or more conditions. As noted above, in some examples, the one or more conditions may identify the conditions that may identify when the STA should enable or disable the UL transmission of RTS/CTS. In one or more examples, the AP may either broadcast or unicast the configuration message based on the determining step of 920. Aspects of 925 may also be performed by the transceiver 402 described with reference to FIG. 4.

Figure 9B:
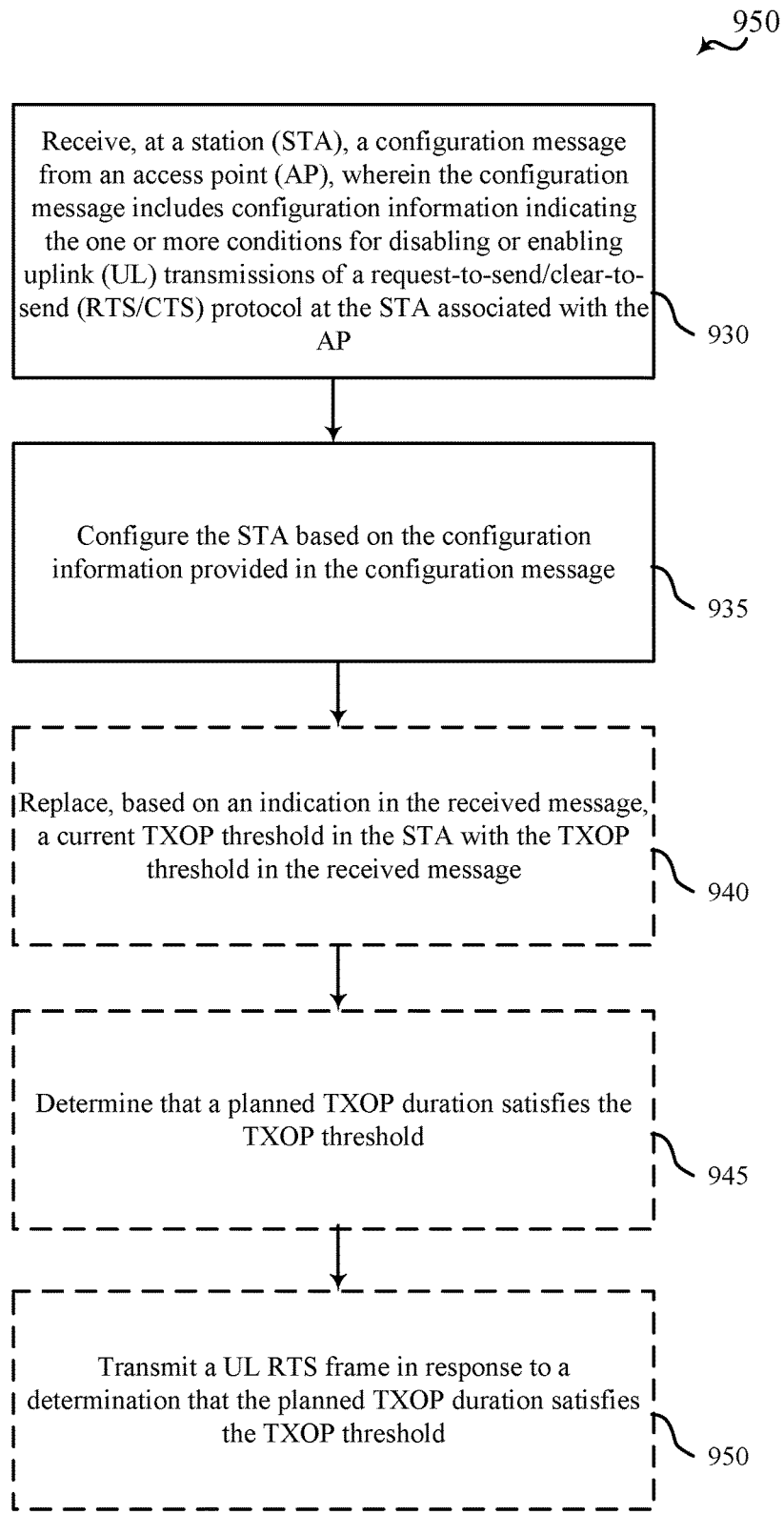
FIG. 9B is a flowchart of an example method of wireless communication implemented on a STA in accordance with various aspects of the present disclosure.

FIG. 9B is a flowchart conceptually illustrating an example of a method 950 of wireless communication, in accordance with aspects of the present disclosure. For clarity, the method 950 is described below with reference to STA 115 described with reference to FIG. 1 and FIG. 5. In some examples, the method 950 may incorporate, in whole or in part, aspects of the methods 304 and 820 described with reference to FIGS. 3B and 8B respectively.

At 930, the method may include receiving, at a STA, a configuration message from an AP, the configuration message includes configuration information indicating the one or more conditions for disabling or enabling UL transmissions of a RTS/CTS protocol at the STA associated with the AP. Aspects of 930 may be performed by transceiver 502 described with reference to FIG. 5.

At 935, the method may include configuring the STA based on the configuration information provided in the configuration message. Aspects of 935 may be performed by configuration component 505 described with reference to FIG. 5.

At block 940 of method, the STA may replace or overwrite, based on an indication in the configuration message received from the AP, a current TXOP threshold in the STA with the TXOP threshold in the received message. Aspects of 940 may be performed by TXOP threshold component 515 described with reference to FIG. 5.

At block 945 of method, the STA may determine that a planned TXOP duration satisfies (e.g., exceeds) the TXOP threshold. Aspects of 945 may also be performed by TXOP threshold component 515 described with reference to FIG. 5.

At block 950 of method, the STA may transmit, an UL RTS frame in response to the determination that the planned TXOP duration satisfies the TXOP threshold. Aspects of block 950 may be performed by transceiver 502 described with reference to FIG. 5. The apparatus and methods have been described in the detailed description and illustrated in the accompanying drawings by various elements comprising blocks, modules, components, circuits, steps, processes, algorithms, and the like. These elements, or any portion thereof, either alone or in combinations with other elements and/or functions, may be implemented using electronic hardware, computer software, or any combination thereof. Whether such elements are implemented as hardware or software depends upon the particular application and design constraints imposed on the overall system. In an aspect, the term "component" as used herein may be one of the parts that make up a system and may be divided into other components.

By way of example, an element, or any portion of an element, or any combination of elements may be implemented with a "processing system" that includes one or more processors. A processor may include a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on transitory or non-transitory computer-readable medium. A non-transitory computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), static RAM (SRAM), dynamic RAM (DRAM), synchronous dynamic RAM (SDRAM); double date rate RAM (DDRAM), read only memory (ROM), programmable ROM (PROM), erasable PROM (EPROM), electrically erasable PROM (EEPROM), a general register, or any other suitable non-transitory medium for storing software.

The various interconnections within a processing system may be shown as buses or as single signal lines. Each of the buses may alternatively be a single signal line, and each of the single signal lines may alternatively be buses, and a single line or bus might represent any one or more of a myriad of physical or logical mechanisms for communication between elements. Any of the signals provided over various buses described herein may be time-multiplexed with other signals and provided over one or more common buses.

The various aspects of this disclosure are provided to enable one of ordinary skill in the art to practice the present invention. Various modifications to examples of implementations presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the examples of implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. A method for wireless communication, comprising:
   identifying, at an access point (AP), one or more conditions for triggering one or both of disabling or enabling uplink (UL) transmissions of a request-to-send/clear-to-send (RTS/CTS) protocol at a station (STA) associated with the AP, wherein identifying the one or more conditions further comprises identifying a packet type for which to disable the UL transmissions of the RTS/CTS protocol at the STA;
   determining, at the AP, a duration transmit opportunity (TXOP) threshold for the STA;
   determining whether to broadcast a message having the TXOP threshold to one or more STAs including the STA or to unicast the message to the STA;
   transmitting the message according to the determination of whether to broadcast the message or unicast the message, wherein the STA enables the UL transmissions of the RTS/CTS protocol at the STA when a planned TXOP duration associated with the STA satisfies the TXOP threshold; and
   transmitting a configuration message to the STA, the configuration message including configuration information indicating the one or more conditions for triggering at the STA one or both of disabling or enabling the UL transmission of the RTS/CTS protocol, and wherein the configuration information further indicates the packet type.

2. The method of claim 1, wherein the one or more conditions include a disabling condition in which a transmission overhead parameter is less than a predetermined overhead threshold.

3. The method of claim 2, wherein:
   the transmission overhead parameter is a PLCP protocol data unit (PPDU) duration and the predetermined overhead threshold is a PPDU threshold, or
   the transmission overhead parameter is a transmit opportunity (TXOP) and the predetermined overhead threshold is a TXOP threshold.

4. The method of claim 1, wherein the one or more conditions include a disabling condition in which a link quality parameter is greater than a predetermined link quality threshold.

5. The method of claim 4, wherein:
   the link quality parameter is a RSSI and the predetermined link quality threshold is a RSSI threshold, or
   the link quality parameter is a MCS index value and the predetermined link quality threshold is a RSSI threshold.

6. The method of claim 1, wherein:
   identifying the one or more conditions comprises identifying a time window or channel in which to disable the UL transmissions of the RTS/CTS protocol at the STA, and
   the configuration message includes configuration information indicating the time window or channel.

7. The method of claim 1, wherein the one or more conditions include a disabling condition in which a collision parameter is less than a predetermined collision threshold.

8. The method of claim 7, wherein:
   the collision parameter is a PER and the predetermined collision threshold is a PER threshold, or
   the collision parameter is a number of retransmissions and the predetermined collision threshold is a retry threshold.

9. The method of claim 1, further comprising transmitting an indication to replace a current TXOP threshold with the TXOP threshold in the message.

10. The method of claim 9, wherein transmitting the message includes broadcasting the message and the indication is a single bit in the broadcast message that is a common indication for each of the one or more STAs to replace a current TXOP threshold with the TXOP threshold in the broadcast message.

11. The method of claim 9, wherein transmitting the message includes broadcasting the message and the indication is a bitmap in the broadcast message where each set bit in the bitmap identifies a respective one of the one or more STAs for which the current TXOP threshold is to be replaced with the TXOP threshold in the broadcast message.

12. The method of claim 1, wherein transmitting the message includes unicasting the message to the STA and a current TXOP threshold in the STA is a previously broadcast TXOP threshold to be replaced with the TXOP threshold in the unicast message.

13. The method of claim 1, wherein the message includes an uplink (UL) request-to-send/clear-to-send (RTS/CTS) control information element (IE) having the TXOP threshold.

14. A method for wireless communication, comprising:
receiving, at a station (STA), a configuration message from an access point (AP), including configuration information indicating one or more conditions for triggering one or both of disabling or enabling uplink (UL) transmissions of a request-to-send/clear-to-send (RTS/CTS) protocol at the STA associated with the AP;
configuring the STA based on the configuration information provided in the configuration message, wherein the configuration information further indicates a packet type for which to disable the UL transmissions of the RTS/CTS protocol at the STA;
receiving, at the STA, a message having a transmit opportunity (TXOP) threshold;
replacing, based on an indication in the received message, a current TXOP threshold in the STA with the TXOP threshold in the received message;
determining that a planned TXOP duration satisfies the TXOP threshold; and
transmitting an UL RTS frame in response to a determination that the planned TXOP duration satisfies the TXOP threshold.

15. The method of claim 14, wherein the message is a broadcast message from the AP, and the indication is a single bit in the broadcast message that is a common indication to replace the current TXOP threshold with the TXOP threshold in the broadcast message.

16. The method of claim 14, wherein the message is a broadcast message from the AP, and the indication is a bitmap in the broadcast message where one set bit in the bitmap identifies the STA as an STA for which the current TXOP threshold is to be replaced with the TXOP threshold in the broadcast message.

17. The method of claim 14, wherein the message is a unicast message and the current TXOP threshold in the STA is a previously broadcast TXOP threshold to be replaced with the TXOP threshold in the unicast message.

18. The method of claim 14, wherein the message includes an uplink (UL) request-to-send/clear-to-send (RTS/CTS) control information element (IE) having the TXOP threshold.

19. An apparatus for wireless communication, comprising:
a processor; and
a memory coupled to the processor, wherein the memory includes instructions executable by the processor to:
identify, at an access point (AP), one or more conditions that trigger one or both of disabling or enabling uplink (UL) transmissions of a request-to-send/clear-to-send (RTS/CTS) protocol at a station (STA) associated with the AP;
identify a packet type for which to disable the UL transmissions of the RTS/CTS protocol at the STA; and
transmit a configuration message to the STA, including configuration information indicating the packet type and the one or more conditions that trigger at the STA one or both of disabling or enabling the UL transmission of the RTS/CTS protocol, and wherein the instructions executable by the processor are further executable to:
determine, at the AP, a transmit opportunity (TXOP) threshold for the STA;
determine whether to broadcast a message having the TXOP threshold to one or more STAs including the STA or to unicast the message to the STA; and
transmit the message according to the determination of whether to broadcast the message or unicast the message, wherein the STA enables the UL transmissions of the RTS/CTS protocol at the STA when a planned TXOP duration associated with the STA satisfies the TXOP threshold.

20. The apparatus of claim 19, wherein the one or more conditions include a disabling condition in which a transmission overhead parameter is less than a predetermined overhead threshold.

21. The apparatus of claim 19, wherein the one or more conditions include a disabling condition in which a link quality parameter is greater than a predetermined link quality threshold.

22. The apparatus of claim 19, wherein the instructions are further executable to:
identify a time window or channel in which to disable the UL transmissions of the RTS/CTS protocol at the STA based on the one or more conditions.

23. An apparatus for wireless communication, comprising:
a processor; and
a memory coupled to the processor, wherein the memory includes instructions executable by the processor to:
receive, at a station (STA), a configuration message from an access point (AP), including configuration information indicating one or more conditions that trigger one or both of disabling or enabling uplink (UL) transmissions of a request-to-send/clear-to-send (RTS/CTS) protocol at the STA associated with the AP;
configure the STA based on the configuration information provided in the configuration message, wherein the configuration information further indicates a packet type for which to disable the UL transmissions of the RTS/CTS protocol at the STA;
receive, at the STA, a message having a transmit opportunity (TXOP) threshold;
replace, based on an indication in the received message, a current TXOP threshold in the STA with the TXOP threshold in the received message;
determine that a planned TXOP duration satisfies the TXOP threshold; and transmit an UL RTS frame in response to a determination that the planned TXOP duration satisfies the TXOP threshold.

24. The apparatus of claim 23, wherein the configuration message is a broadcast message from the AP, and the configuration information of the configuration message includes a single bit in the broadcast message that is a common indication to replace the current TXOP threshold with the TXOP threshold in the broadcast message.

25. The apparatus of claim 23, wherein the configuration message is a broadcast message from the AP, and the configuration information of the configuration message includes a bitmap in the broadcast message where one set bit in the bitmap identifies the STA as an STA for which the current TXOP threshold is to be replaced with the TXOP threshold in the broadcast message.

* * * * *